(12) United States Patent
Apps

(10) Patent No.: US 6,644,219 B2
(45) Date of Patent: Nov. 11, 2003

(54) PALLET ASSEMBLY

(75) Inventor: William P. Apps, Alpharetta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 09/944,480

(22) Filed: Sep. 1, 2001

(65) Prior Publication Data

US 2002/0011195 A1 Jan. 31, 2002

Related U.S. Application Data

(63) Continuation of application No. 09/330,150, filed on Jun. 11, 1999, now Pat. No. 6,283,044, which is a continuation-in-part of application No. 09/108,532, filed on Jul. 1, 1998, now Pat. No. 6,250,234.

(51) Int. Cl.$^7$ .............................................. B65D 19/00
(52) U.S. Cl. ................................................... 108/57.25
(58) Field of Search ......................... 108/57.25, 57.27, 108/57.26, 57.28, 901, 902, 51.11

(56) References Cited

U.S. PATENT DOCUMENTS

| | | | |
|---|---|---|---|
| 1,910,781 | A | 5/1933 | Way |
| 2,544,657 | A | 3/1951 | Cushman |
| 2,699,912 | A | 1/1955 | Cushman |
| 2,828,933 | A | 4/1958 | De Pew et al. |
| 2,991,965 | A | 7/1961 | Drieborg |
| 3,126,843 | A | 3/1964 | De Laney |
| 3,152,693 | A | 10/1964 | Anderson |
| 3,187,689 | A | 6/1965 | Hess |
| 3,307,504 | A | 3/1967 | Cloy et al. |
| 3,424,110 | A | 1/1969 | Toot |
| 3,467,032 | A | 9/1969 | Rowlands et al. |
| 3,481,285 | A | 12/1969 | Yellin |

(List continued on next page.)

FOREIGN PATENT DOCUMENTS

| | | |
|---|---|---|
| DE | 2 232 200 | 1/1973 |
| DE | 26 13 083 | 10/1977 |
| DE | 27 33 457 | 2/1979 |
| DE | 3205910 A1 | 11/1983 |
| DE | 38 06 097 | 9/1989 |
| EP | 166485 | 7/1921 |
| EP | 1310898 | 3/1973 |
| EP | 0202203 | 11/1986 |
| EP | 0 226 505 | 6/1987 |
| EP | 0301445 | 2/1989 |
| EP | 0 957 039 A1 | 11/1999 |
| FR | 2 274 512 | 8/1974 |
| FR | 2 259 023 | 1/1975 |
| FR | 2 486 029 | 7/1980 |
| RU | 701 869 | 12/1979 |
| WO | WO 90/01448 | 2/1990 |
| WO | WO 94/08861 | 10/1992 |
| WO | WO 99/58420 | 11/1999 |

OTHER PUBLICATIONS

EPC Loudon Brochure "Plastic Pallets for the Beverage Industry" dated 4/1997.

"Chapter 1: Heated Tool Welding," *The Handbook of Plastics Joining*, Plastics Design Library, 1997, pp. 1–8.

*Primary Examiner*—Jose V. Chen

(57) ABSTRACT

A pallet includes a first component which has a first upper surface, and a first lower surface which includes a first plurality of cross-rib members. A second component has a second lower surface, and a second upper surface which includes a second plurality of cross-rib members corresponding and mounted to the first plurality of cross-rib members. A third component is adjacent the second component and has a third upper surface, and a third lower surface which includes a third plurality of cross-rib members. A fourth component has a fourth upper surface which includes a fourth plurality of cross-rib members corresponding and mounted to the third plurality of cross-rib members. A plurality of intermediate column members extend between the second lower surface and third upper surface.

8 Claims, 29 Drawing Sheets

U.S. PATENT DOCUMENTS

| | | |
|---|---|---|
| 3,580,190 A | 5/1971 | Fowler |
| 3,602,157 A | 8/1971 | Cohen et al. |
| 3,603,272 A | 9/1971 | Ditges |
| 3,606,844 A | 9/1971 | Lubker et al. |
| 3,613,605 A | 10/1971 | Holdredge, Jr. |
| 3,638,586 A | 2/1972 | Elshout |
| 3,640,229 A | 2/1972 | Bell |
| 3,651,769 A | 3/1972 | Foley |
| 3,654,874 A | 4/1972 | Skinner |
| 3,664,271 A | 5/1972 | Wolder et al. |
| 3,667,403 A | 6/1972 | Angelbeck, Jr. |
| 3,675,595 A | 7/1972 | Sullivan |
| 3,678,868 A | 7/1972 | Hirota |
| 3,680,495 A | 8/1972 | Pike |
| 3,680,496 A | 8/1972 | Westlake, Jr. |
| 3,683,821 A | 8/1972 | Mangold |
| 3,685,461 A | 8/1972 | Belcher |
| 3,699,901 A | 10/1972 | Cook, III |
| 3,699,902 A | 10/1972 | Allgeyer et al. |
| 3,710,733 A | 1/1973 | Story |
| 3,720,176 A | 3/1973 | Munroe |
| 3,759,194 A | 9/1973 | Fujii et al. |
| 3,795,206 A | 3/1974 | Utz |
| D231,096 S | 4/1974 | Adam |
| 3,814,031 A | 6/1974 | Fowler |
| D232,019 S | 7/1974 | Rehrig et al. |
| 3,824,933 A | 7/1974 | Lind |
| 3,835,792 A | 9/1974 | Wharton |
| 3,861,326 A | 1/1975 | Brown |
| 3,868,915 A | 3/1975 | Hafner |
| 3,878,796 A | 4/1975 | Morrison |
| 3,916,803 A | 11/1975 | Garcia |
| 3,917,066 A | 11/1975 | Cloyd |
| 3,938,448 A | 2/1976 | Nishitani et al. |
| 3,964,400 A | 6/1976 | Brand |
| 3,994,241 A | 11/1976 | Evans |
| 4,002,126 A | 1/1977 | Bell et al. |
| 4,013,021 A | 3/1977 | Steinlein et al. |
| 4,051,787 A | 10/1977 | Nishitani et al. |
| D246,296 S | 11/1977 | Fujii et al. |
| 4,103,857 A | 8/1978 | Levenhagen |
| 4,133,270 A | 1/1979 | Ravera |
| 4,146,205 A | 3/1979 | Skinner |
| 4,183,491 A | 1/1980 | Sanders et al. |
| 4,220,100 A | 9/1980 | Palomo et al. |
| 4,287,836 A | 9/1981 | Aoki |
| 4,316,419 A | 2/1982 | Cupido |
| 4,403,555 A | 9/1983 | Forrest |
| 4,597,338 A | 7/1986 | Kreeger |
| 4,606,278 A | 8/1986 | Shuert |
| RE32,344 E | 2/1987 | Wind |
| 4,735,154 A | 4/1988 | Hemery |
| 4,742,781 A | 5/1988 | Shuert |
| 4,799,433 A | 1/1989 | Luft |
| 4,843,976 A | 7/1989 | Pigott et al. |
| 4,869,456 A | 9/1989 | Jacobs |
| 4,951,821 A | 8/1990 | Kempkes |
| 4,972,782 A | 11/1990 | Shepherd et al. |
| 4,998,619 A | 3/1991 | Sowa et al. |
| 5,042,396 A | 8/1991 | Shuert |
| 5,046,434 A | 9/1991 | Breezer et al. |
| 5,097,951 A | 3/1992 | Pigott et al. |
| 5,117,762 A | 6/1992 | Shuert |
| 5,154,286 A | 10/1992 | Gits |
| 5,160,029 A | 11/1992 | Pigott et al. |
| 5,197,395 A | 3/1993 | Pigott et al. |
| 5,205,221 A | 4/1993 | Melin et al. |
| D346,681 S | 5/1994 | Pigott et al. |
| D347,511 S | 5/1994 | Pigott et al. |
| 5,337,681 A | 8/1994 | Schrage |
| 5,343,814 A | 9/1994 | Pigott et al. |
| D354,606 S | 1/1995 | Pigott et al. |
| 5,391,251 A | 2/1995 | Shuert |
| 5,401,347 A | 3/1995 | Shuert |
| 5,404,829 A | 4/1995 | Shuert |
| D364,030 S | 11/1995 | Pigott et al. |
| 5,470,641 A | 11/1995 | Shuert |
| D370,763 S | 6/1996 | Pigott et al. |
| D371,882 S | 7/1996 | Kristoffersson |
| D372,192 S | 7/1996 | Pigott et al. |
| 5,549,056 A | 8/1996 | Jordan et al. |
| 5,555,820 A | 9/1996 | Shuert |
| 5,566,624 A | 10/1996 | Brown et al. |
| 5,579,686 A | 12/1996 | Pigott et al. |
| D378,458 S | 3/1997 | Pigott et al. |
| 5,638,760 A | 6/1997 | Jordan et al. |
| 5,666,886 A | 9/1997 | Alexander et al. |
| 5,676,064 A | 10/1997 | Shuert |
| 5,736,221 A | 4/1998 | Hardigg et al. |
| 5,755,162 A | 5/1998 | Knight et al. |
| 5,778,801 A | 7/1998 | Delacour |
| D398,731 S | 9/1998 | Pigott et al. |
| D398,732 S | 9/1998 | Pigott et al. |
| 5,806,436 A | 9/1998 | Weichenrieder, Sr. et al. |
| 5,836,255 A | 11/1998 | Uitz |
| 5,845,588 A | 12/1998 | Gronnevik |
| 5,868,080 A | 2/1999 | Wyler et al. |
| 5,950,546 A | 9/1999 | Brown et al. |
| 6,006,677 A | 12/1999 | Apps et al. |
| 6,125,770 A * | 10/2000 | Brandenburg ............ 108/57.25 |
| 6,138,582 A * | 10/2000 | Fujii et al. ............... 108/57.25 |
| 6,199,488 B1 * | 3/2001 | Favaron et al. .......... 108/57.25 |
| 6,250,234 B1 | 6/2001 | Apps |
| 6,283,044 B1 | 9/2001 | Apps |

\* cited by examiner

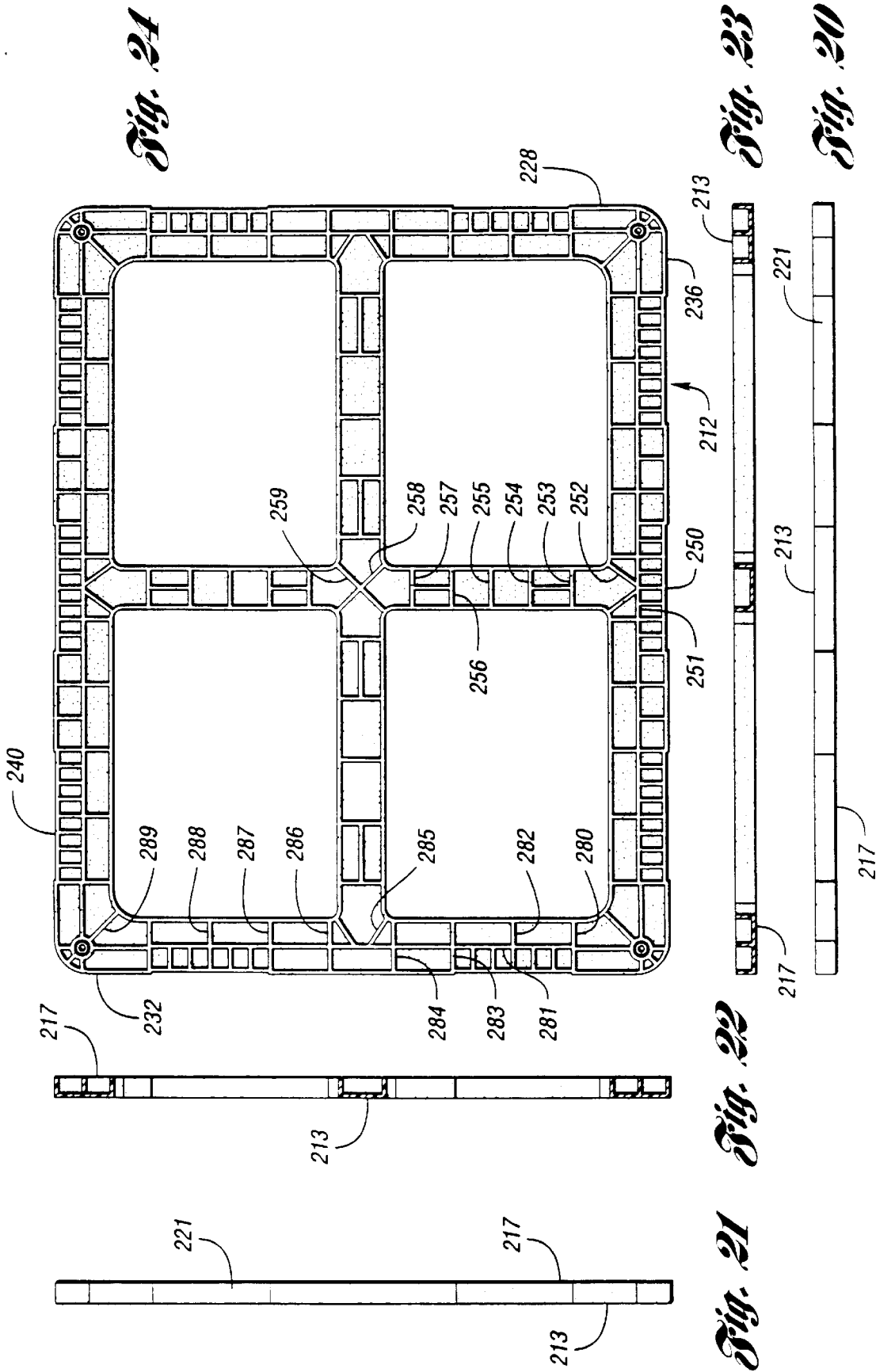

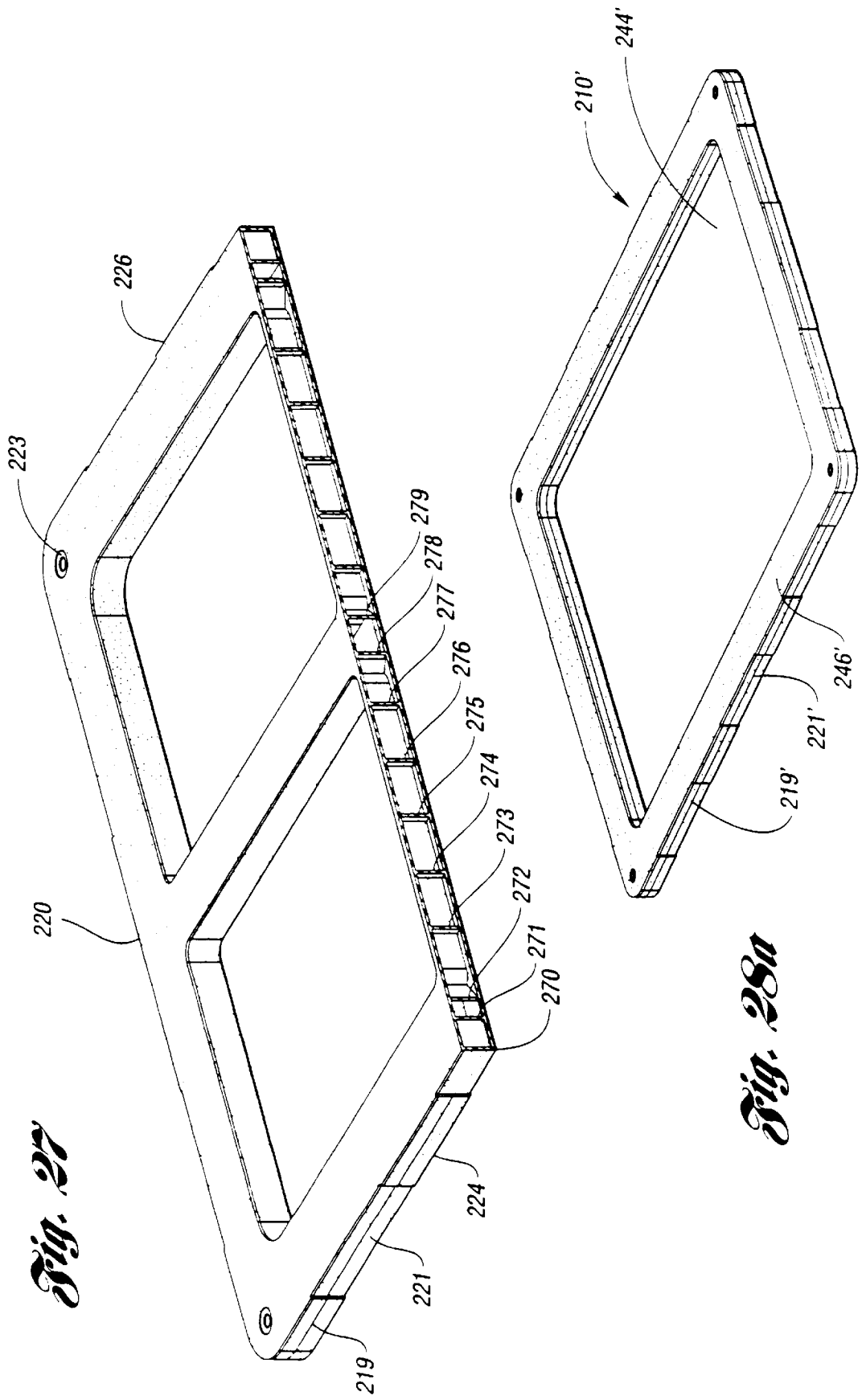

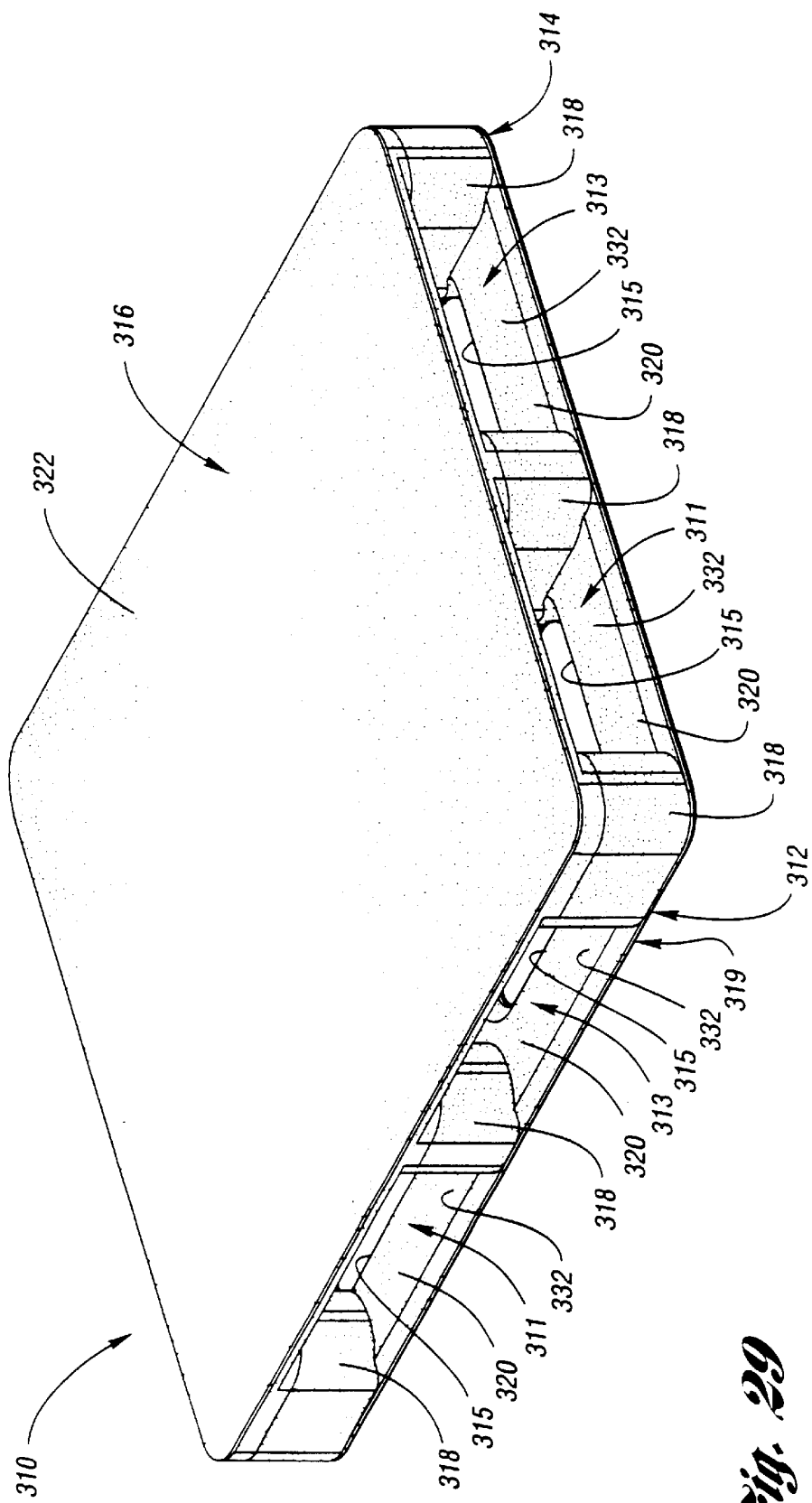

PALLET ASSEMBLY

CROSS-REFERENCE TO RELATED APPLICATION

This application is a continuation of U.S. utility application Ser. No. 09/330,150 filed Jun. 11, 1999, now U.S. Pat. No. 6,283,044 which is a continuation-in-part of U.S. utility application Ser. No. 09/108,532 filed Jul. 1, 1998 now U.S. Pat. No. 6,250,234.

TECHNICAL HELD

This invention relates to a plastic pallet assembly for storing or transporting goods.

BACKGROUND ART

Pallets used in industry today are most commonly formed of wood slats and stringers or blocks which are nailed together. While such pallets are functional, they have many disadvantages. First, wood pallets are relatively heavy. Second, wood is not easily cleaned because it absorbs water and other liquids which damage and warp the wood. For these same reasons, the use of wood pallets outside or in wet environments is also limited. Wood pallets are often not consistently dimensioned due to size variations in the wood slats and shrinkage of wood over time, thus preventing such pallets from being stacked or stored in a stable or consistent manner. Also, inconsistent dimensions make automation of these pallets more difficult. Further, the nails used to fasten wood pallets together may cause damage to goods which are stored and transported on the pallet, or wood splinter may result after time. Moreover, once wood pallets are damaged, they have little or no residual value and also necessitate disposal fees.

Replacing wood pallets with plastic pallets has been a goal for many years. The advantages of plastic pallets are many as compared to wood, including greater durability, lighter weight, more consistent dimensions, improved cleanliness, water resistance, higher residual value for recycling, and no nails which may damage products being supported thereon. While many plastic pallets have been attempted, the designs that are able to approximate the strength of wood, to date, have been cost prohibitive and may not have the requisite strength properties. For example, plastic pallets having a solid section, while having favorable stiffness and deflection properties, are heavy and utilize a relatively large quantity of material in their formation. Wood is five to eight times stiffer than a typical plastic used to make pallets. Plastic pallets must either use much more material, be taller, or have reinforcements such as steel rods or glass fillers to compensate for this difference. While conventional plastic pallets have ribbed supports to decrease their weight, they often lack the desired stiffness and low creep properties of the solid pallet, and in order to improve these properties, the height of the pallet must be increased, or reinforcements must be added to the plastic such as steel or other composite reinforcements. Of course, these additions to the plastic cause an increase in material density leading to an even heavier pallet. Further, engineering resins are very expensive resulting in a more expensive pallet.

Another hurdle to overcome with plastic is the cost. Plastic pallets are more expensive than wood by three to five times. This cost can be offset by the number of trips or shipments that can be achieved with plastic versus wood pallets. Another major hurdle is the stiffness of plastic pallets. Racking loaded pallets in warehouses for upwards of 30 days may be common, and the combination of low tensile strength and creep may limit the use of plastic in this manner.

There are three conventional methods of overcoming these weaknesses. The first is to add reinforcement such as steel or a composite to the pallet. This generally adds significant cost and weight and complicates recycling of the pallet. The second is to make the pallet taller. This generally limits the height of a product which is to be stacked on the pallet, as well as the number of pallets that may be stored in a given area. The third is to use reinforced or engineered resins. Again, this adds significant cost and weight. All three obviously limit the acceptance of plastic pallets.

U.S. Pat. No. 3,580,190 provides a partial solution to the stiffness problem by attaching top and bottom sheets 22,24 to the structural network 23, as shown in FIG. 1 thereof. However, this solution does not resolve the bending stiffness problem because large lateral and longitudinal unsupported areas still exist, such as in areas 26, 37, 38, 49 and 50. In other words, this design merely further stiffens the support column areas 67, 68, 69, 97, 98, 99, 28, 30, 32, which already provide substantial stiffness merely as a result of their height. The weakness of this design is apparent in column 6, lines 60–71, where the reference recommends the use of a material having a flexural modulus (or Young's modulus) greater than about 200,000 psi. Such a high modulus material is apparently required because the structure described does not provide significant resistance to deflection along the length and width of the pallet. High modulus materials add substantial cost to the pallet.

Moreover, pallets typically require large openings for receipt of pallet jacks. Because of these large openings, the pallet structure is typically thin and weak and has poor deflection stiffness. Because pallets are exposed to significant abuse, any solution to the stiffness problem must not adversely affect the impact strength of the pallet.

Consequently, an improved pallet is desired which should be reasonably inexpensive, lightweight and sturdy. The improved pallet should also have improved stiffness and creep properties. The pallet should also be able to withstand various environmental conditions to which it may be exposed, particularly moisture. The improved pallet should also be easy to store, have a size compatible with a standard wood pallet, and be reusable. Also, a need exists for improving the stiffness of plastic pallets configured to receive a pallet jack, without reducing impact strength of the pallet. The improved pallet design should also apply to components used in association with pallets.

DISCLOSURE OF INVENTION

It is a principal object according to the present invention to provide an improved pallet assembly which is relatively lightweight, inexpensive to manufacture and assemble, and consistently dimensioned.

It is another object according to the present invention to provide an improved pallet assembly which has desirable strength, stiffness, creep, and deflection properties.

It is another object according to the present invention to provide an improved pallet assembly which is able to withstand varied environmental conditions, particularly moisture, with little damage or wear and is readily reusable.

It is yet another object according to the present invention to provide an improved pallet assembly which may be stored, racked or stacked in a stable manner.

Another object of the present invention is to provide a method of structurally reinforcing a plastic pallet configured to receive a pallet jack, in a manner which improves stiffness without loss of impact strength.

It is yet another object to provide a highly stiff pallet without the use of the reinforcements or engineered resins which increase the cost and weight of the pallet, i.e., to provide an inherently stiff pallet design.

Further, it is another object according to the present invention to provide an improved design for components used in association with pallets, such as a pallet top frame.

In carrying out these and other objects and goals according to the present invention, a pallet assembly is provided which includes a top deck formed of plastic which has a first opposing surface having a plurality of first flanged portions projecting downwardly therefrom. The pallet assembly top deck portion has a substantially planar upper surface upon which a plurality of objects may be rested. The pallet assembly also includes a bottom deck portion which is also formed of plastic and has a second opposing surface with a plurality of second flanged portions projecting therefrom in an upward direction. In this assembly, the pluralities of second flanged portions correspond to and securely mate with the plurality of first flanged portions to define a plurality of columns between the top deck and bottom deck portions, said top and bottom deck portions and said columns having a box beam cross-section for providing strength to the pallet assembly.

The overall box beam pallet design according to the present invention also has desirable improved properties, such as increased stiffness versus weight, over other standard beam section designs having equivalent surface areas, sizes, and weights, such as a T-rib beam, or an inverted-U (multiple ribbed) design, and has properties equivalent to that of the I-beam section.

In a preferred assembly, the top deck portion includes a top member and a mid-top member which have corresponding mating flanged surfaces which are securely mated to each other. In this preferred assembly, the mid-top member has the first opposing surface opposite the corresponding mating flanged surfaces. In still another preferred assembly, the bottom deck portion includes a bottom member and a mid-bottom member each having corresponding mating flanged surfaces which are securely mated to each other. In this preferred assembly, the mid-bottom member has the second opposing surface opposite its corresponding mating flange surfaces.

More particularly, the first or top member includes a substantially flat top surface with ribs protruding in a downward direction. The second or mid-top member has a substantially flat bottom surface with ribs extending in an upward direction and partial support columns extending down from this surface. The ribs on both these parts are aligned so they can be welded together by plasticizing their mating surfaces preferably via a hot-plate welding operation to form a box beam top deck. The third or mid-bottom member has a substantially flat upper surface with ribs extending down and partial columns extending up. The fourth or bottom member has a substantially flat bottom surface with ribs extending up. Again, the ribs on both parts are aligned so they can be welded together in a second hot plate welding operation to form a box beam bottom deck. Lastly, the box beam top deck and box beam bottom deck are welded together at the columns that also align, resulting in a pallet where every section is a box beam. In the preferred embodiment, each boxed section has a perforated top and bottom to allow for cleaning and drainage. These perforations may easily be eliminated to create true boxed sections.

In a second embodiment according to the present invention, there is provided a plastic pallet assembly which includes a first pallet portion which is formed of plastic and has a first opposed surface having a plurality of first spacer portions projecting downwardly therefrom which define a first matching surface. This second embodiment also includes a second pallet portion which is also formed of plastic and has a second opposed surface having a plurality of second spacer portions projecting upwardly therefrom which define a second matching surface. The plurality of first and second matching surfaces are then heated to a plasticized state, compressed together, and subsequently cooled in order to define a plurality of columns for spacing apart the first pallet portion and the second pallet portion, each column, first and second pallet portions each having a box beam cross-section for providing strength to the pallet assembly. This method is preferably performed via hot plate welding. In a preferred version of this second embodiment, the first pallet portion includes a first outer member and a first inner member having opposing surfaces which are securely attached to each other by heating them to a plasticized state, compressing them together, and cooling them. As in the first embodiment, the first outer member has a substantially planar first outer surface for supporting and transporting one or more objects thereupon.

Further, the second pallet portion may include a second outer member and a second inner member which have opposing surfaces securely mounted to each other by the process of heating the opposing surfaces to a plasticized state, compressing them together, and cooling them.

In a third embodiment according to the present invention, a plastic pallet assembly includes a first pallet portion which is formed of plastic and includes a top member and a top intermediate member (mid-top member). Each of these members has a first pair of substantially planar surfaces spaced apart from the other and each further has a first pair of mating surfaces which are heat welded together in order to integrally define the first pallet portion. The third embodiment of the plastic pallet assembly also includes a second pallet portion which is formed of plastic and includes a bottom member and a bottom intermediate member (mid-bottom member), each having a second pair of substantially planar surfaces spaced apart from the other and each further having a second pair of mating surfaces which are heat welded together in order to integrally define the second pallet portion. The first intermediate member of the first pallet portion and the second intermediate member of the second pallet portion each has corresponding opposed mating edges which are heat welded together in order to integrally define the pallet assembly.

A fourth embodiment of the pallet assembly according to the present invention is formed substantially of plastic. The fourth embodiment includes a first outer member and a first intermediate member which are spaced apart from each other by a first pair of opposed mating surfaces extending therebetween. The opposed mating surfaces are integrally mounted to each other in order to define a first pallet portion. The fourth embodiment also includes a second outer member and a second intermediate member which are spaced apart from each other by a second pair of opposed mating surfaces extending therebetween. The second pair of opposed mating surfaces is integrally mounted to each other in order to define a second pallet portion. The second intermediate member is oriented adjacent the first intermediate member. The first intermediate member and the second intermediate member have corresponding mounting edge s projecting therefrom which are integrally mounted to each other in order to integrally define the pallet assembly. In this embodiment, the first outer member includes a lower surface with edges projecting therefrom which defines a one of the first pair of opposed mating surfaces, and the first intermediate member has an upper surface with corresponding edges projecting therefrom which defines an other of the first pair of opposed mating surfaces. The second outer member includes an upper surface with edges projecting therefrom which defines a one of the second pair of opposed mating surfaces, and the second intermediate member has a lower surface with corresponding edges projecting therefrom which defines an other of the second pair of opposed mating surfaces.

A fifth embodiment of the portable pallet assembly according to the present invention is for storing and transporting objects thereon and includes a first member which has a substantially planar first upper surface upon which the objects are placed, and also includes a first lower surface. This fifth embodiment also includes a second member which has a second upper surface and a second lower surface, where the second upper surface is securely mounted to the first lower surface to form a plurality of box beam cross-sections. The fifth embodiment further includes a third member which has a third upper surface and a third lower surface. The third upper surface and the second lower surface have corresponding flanged surfaces which are securely mounted to each other to in order to form a plurality of columns having box beam cross-sections defined thereby. This embodiment also includes a fourth member which has a fourth upper surface for mating with the third lower surface and also has a substantially planar fourth lower surface. The fourth upper surface is securely mounted to the third lower surface to form a plurality of box beam sections.

In a preferred version of this fifth embodiment, the second upper surface and first lower surface are each securely mounted to each other by introducing heat therebetween, plasticizing each surface, compressing the surfaces together, and allowing them to cool. In another preferred version, the fourth upper surface and third lower surface are securely mounted to each other by introducing heat therebetween, plasticizing each surface, compressing the surfaces together, and allowing them to cool.

Also disclosed according to the teachings of the present invention is a top frame for a pallet. A top frame is typically used in connection with the mass shipping of objects, such as empty bottles. The top frame is used to help stabilize the shipment of objects at the upper end in conjunction with a pallet at the lower end.

In keeping with the teachings of the present invention, a method for forming a pallet and a top frame for a pallet includes providing first and second pallet portions, each having corresponding mating flanged surfaces. The method also includes introducing heat to the corresponding mating flanged surfaces to melt the mating flanged surfaces in order to thereby form plasticized surfaces. The plasticized surfaces may then be pressed together, and then cooled to form a welded joint therebetween defining a plurality of box sections by the mating flanged surfaces. In this method, the step of providing a first and second pallet portions includes mounting and aligning them in a holding fixture. The step of introducing heat may include introducing a heated platen therebetween. Also, the method may also include the steps of retracting the heated platen from between the corresponding mating flanged surfaces prior to pressing them together and also opening the holding fixture and removing the welded pallet assembly at or near the end of the forming operation. The method may further include heating the mating flanged surfaces under pressure by contacting the heated platen to the mating flanged surfaces for melting the same.

In another method embodiment, more specifically, the present invention provides a method of reinforcing a plastic pallet having a thin top deck portion, a plurality of support columns extending from the top deck portion and a plurality of support rails connected to the support columns to form a thin bottom deck portion, wherein the support rails each include a sheet portion with a plurality of vertical ribs extending therefrom. The method includes the step of welding a plurality of plastic sheets to the vertical ribs between the support columns to form a plurality of substantially rectangular hollow vertical cross-sections along the length of the support rails for improved stiffness. It is contemplated that the substantially rectangular hollow vertical cross-sectional areas may be filled with a secondary material, such as structural foam for improved structural integrity.

The present invention also provides for partial reinforcement of a plastic pallet by affixing sheet strips along relatively weak structural portions of the pallet to form a plurality of substantially rectangular hollow vertical cross-sections along the length of the relatively weak structural portions for improved stiffness without loss of impact strength.

The above objects and other objects, features, and advantages of the present invention are readily apparent from the following detailed description of the best modes for carrying out the invention when taken in connection with the accompanying drawings wherein like reference numerals correspond to like components.

BRIEF DESCRIPTION OF DRAWINGS

FIG. 20 is a front elevational view of the top frame assembly;

FIG. 21 is a side elevational view of the top frame assembly;

FIG. 22 is a sectional view taken along the line 22—22 of FIG. 19;

FIG. 23 is a sectional view taken along the line 23—23 of FIG. 19;

FIG. 24 is a bottom plan view of the first top frame member, the top plan view of the second top frame member being substantially similar thereto;

FIG. 27 is a cross-sectional view taken along a line parallel to the longitudinal center line of the top frame, at line 27—27 in FIG. 19;

FIG. 28a illustrates a perspective view of a second embodiment of a top frame according to the present invention;

FIG. 29 shows a perspective view of another embodiment of a plastic pallet in accordance with the present invention;

BEST MODE FOR CARRYING OUT THE INVENTION

Figure 1:
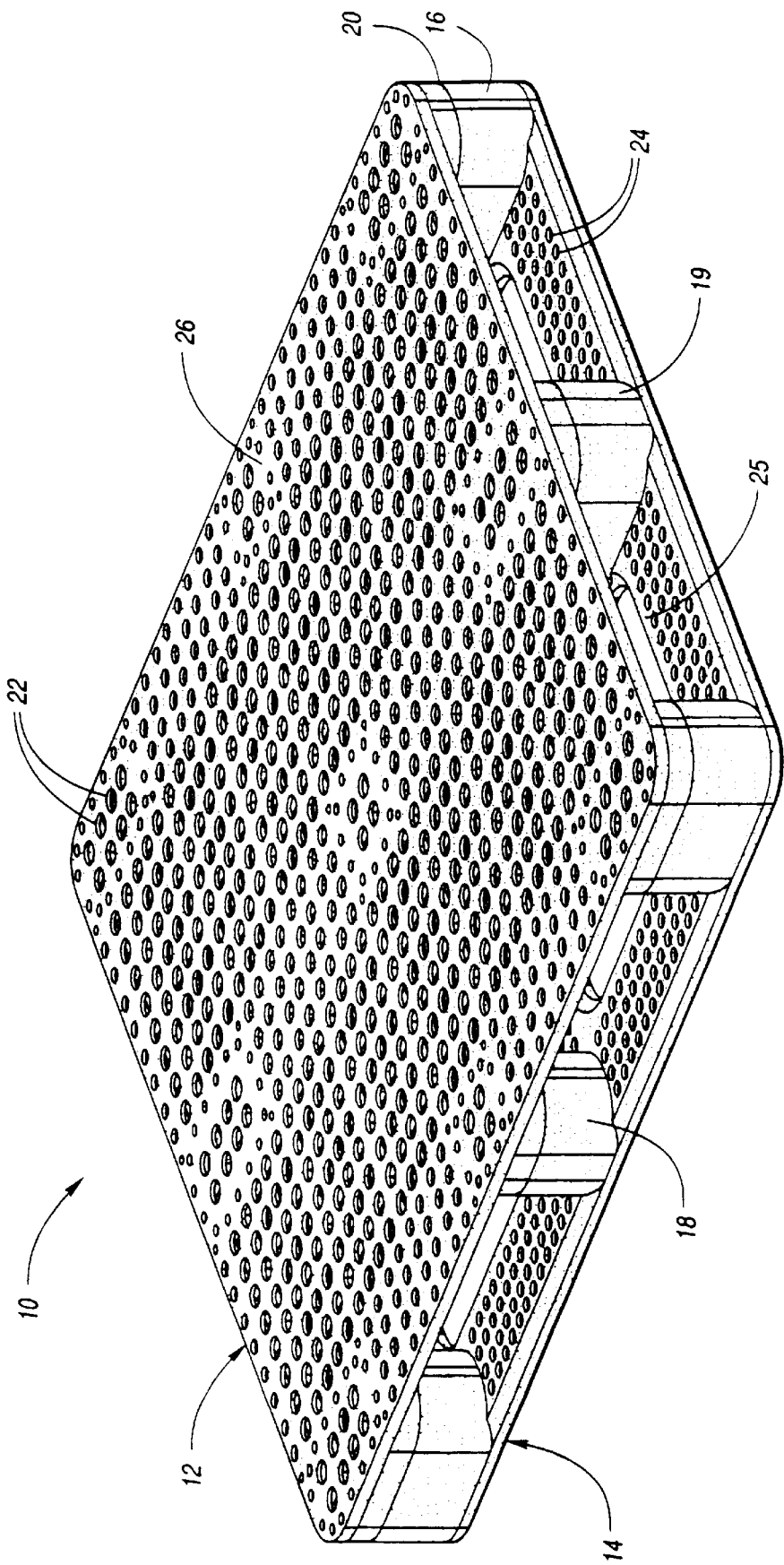
FIG. 1 is a top perspective view of a pallet assembly according to the present invention.

FIG. 1 of the drawings shows a top perspective view of a pallet assembly 10 according to the present invention. Pallet assembly 10 is formed of a thermoplastic or other polymeric material and is preferably, but not necessarily, formed of injection molded components. As illustrated in FIG. 1, pallet assembly 10 includes a top deck 12 and a bottom deck 14 which are spaced apart from each other. Pallet assembly 10 also includes a plurality of columns which extend between the spaced apart top deck 12 and bottom deck 14. The pluralities of columns include corner column portions 16, side column portions 18, and end column portions 19 shown extending between top deck 12 and bottom deck 14. The columns are shown having smooth, rounded outer surfaces in order to prevent damage from fork lift trucks and the like. However, any suitable contour may be used depending on the application. In addition to separating top deck 12 and bottom deck 14, column portions 16, 18, 19 and 32 serve to bear and distribute the load of the objects (for example, the bottles shown in FIG. 18) placed upon top deck 12, and more particularly objects intended to be supported on a top surface 26 of top deck 12.

In one embodiment, top surface 26 is preferably non-skid in order to prevent objects from sliding off during transport. Again, however, any suitable surface texture or geometry may be used depending on the application without departing from the spirit of the invention. As discussed further herein, FIG. 1 illustrates that top deck 12 and bottom deck 14 are joined together at a parting line 20. In a preferred embodiment, top deck 12 and bottom deck 14 also have a plurality of apertures 22 and 24, respectively, formed therethrough in order to decrease the overall weight of pallet assembly 10, as well as provide for a method of draining water and other liquid/debris from pallet assembly 10 so that the liquid/debris is not accumulated thereon. Thus, such apertures are particularly helpful when washing the pallet. Apertures 22, 24 may be any suitable shape, dimension, and density and disposed in a variety of combinations ranging from densely perforated to no perforations depending on the desired application.

Of course, top deck 12 and bottom deck 14 may also have continuous surfaces without apertures 22 and 24. As previously mentioned, top deck 12 includes a substantially flat planar upper surface 26 (first outer surface) upon which objects and goods may be placed for transport and storage. Pallet assembly 10 also includes a plurality of openings 25 for receiving the forks of a fork lift therethrough (best shown in FIG. 13.)

Figure 2:
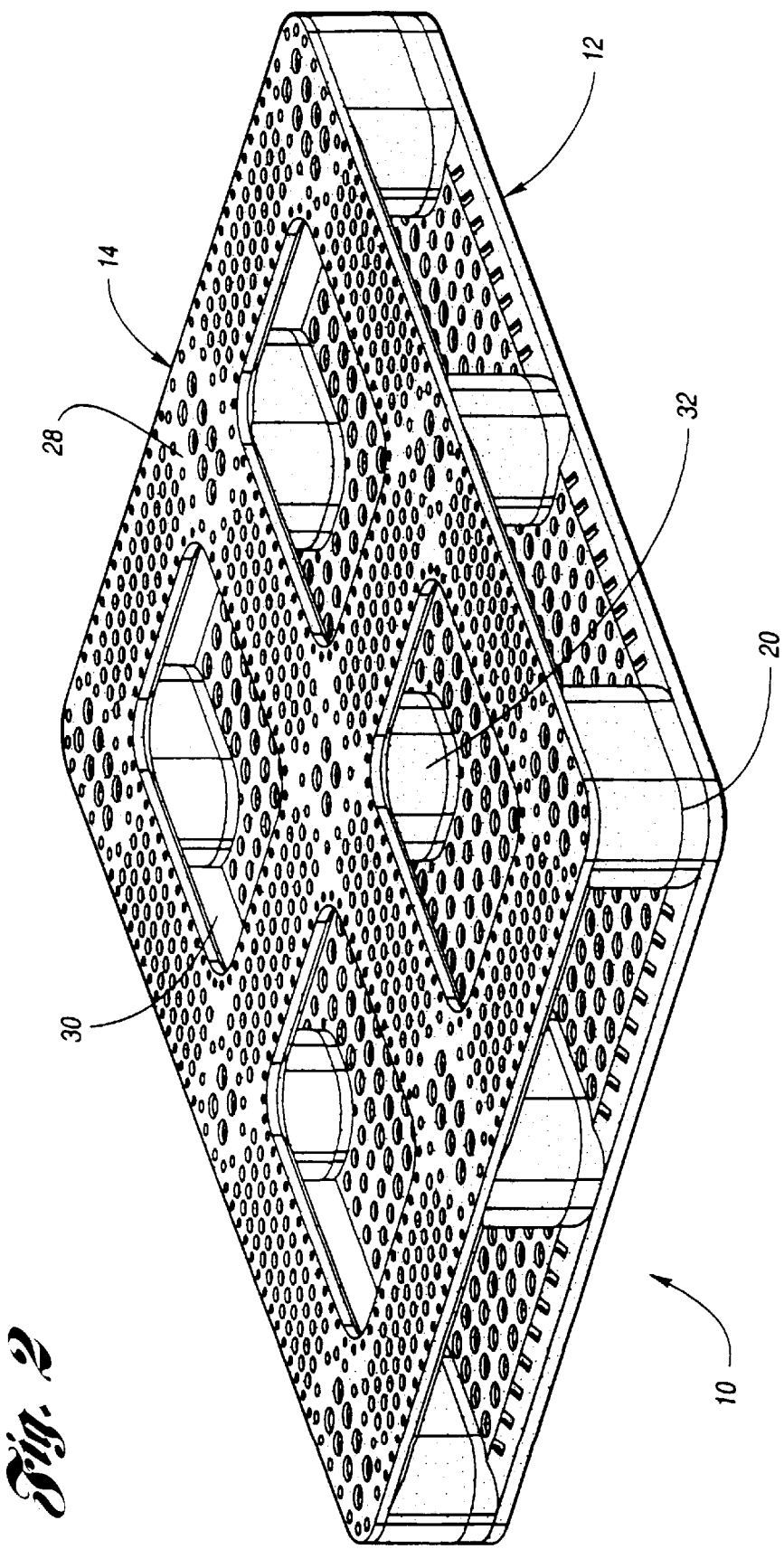
FIG. 2 is a bottom perspective view of the pallet assembly.

FIG. 2 of the drawings illustrates a bottom perspective view of pallet assembly 10. As shown therein, bottom deck 14 includes a substantially flat planar bottom surface 28 for secure placement upon a ground or other resting surface, or also for stable orientation on a similarly designed pallet for stacking purposes. Note that bottom deck 14 also has four relatively larger openings 30 situated therein for accommodating pallet jacks. Although shown as substantially rectangular in shape, openings 30 may be any suitable shape and dimension limited only by the desired application. In addition to corner column portions 16, side column portions 18, and end column portions 19, a central column portion 32 is provided in the central area of the pallet assembly between top deck 12 and bottom deck 14, and like its counterparts also serves to bear and distribute the loads placed on top deck 12.

Figure 3:
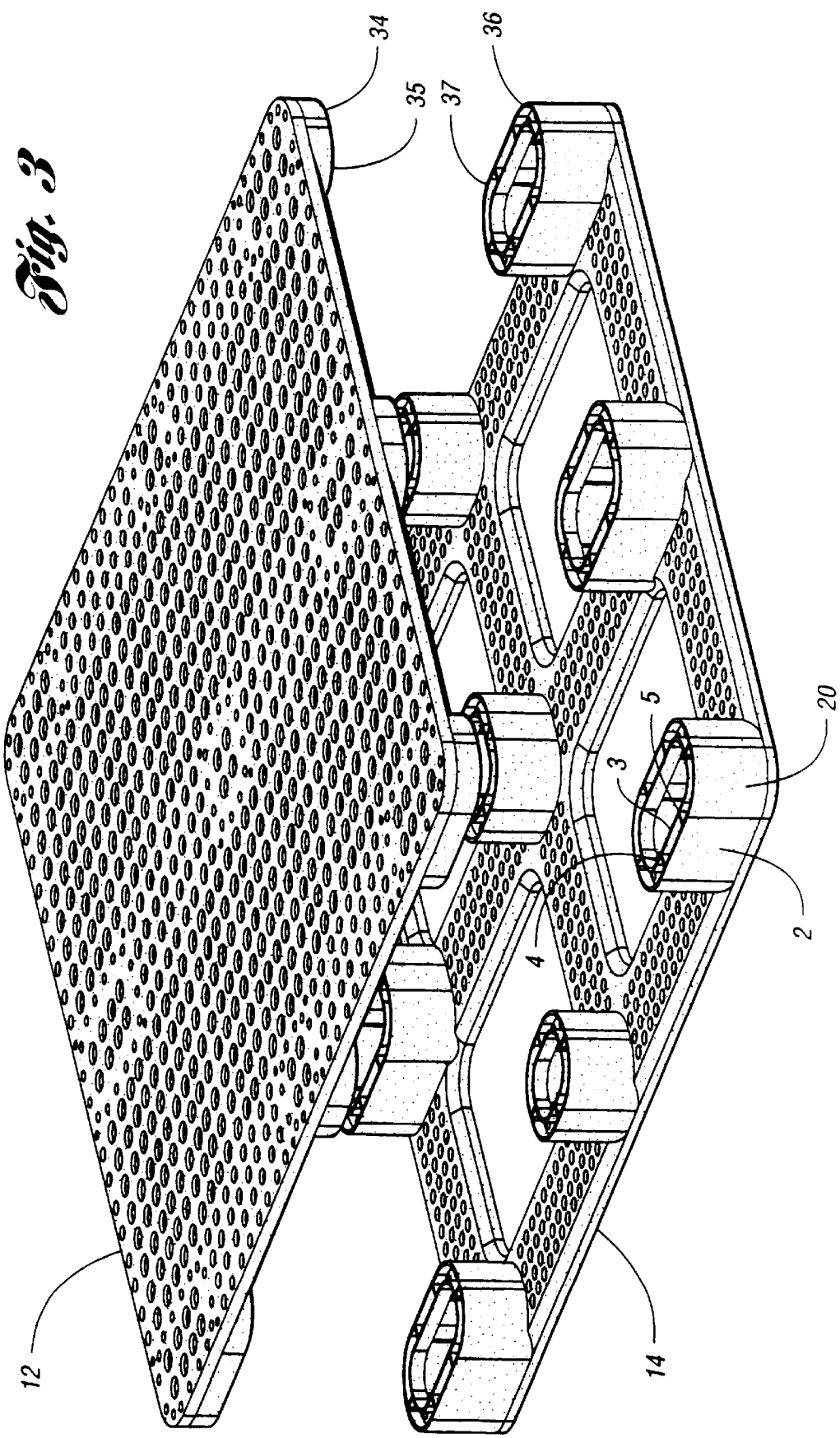
FIG. 3 is an exploded top perspective view of the pallet assembly, showing the top deck and bottom deck.
Figure 4:
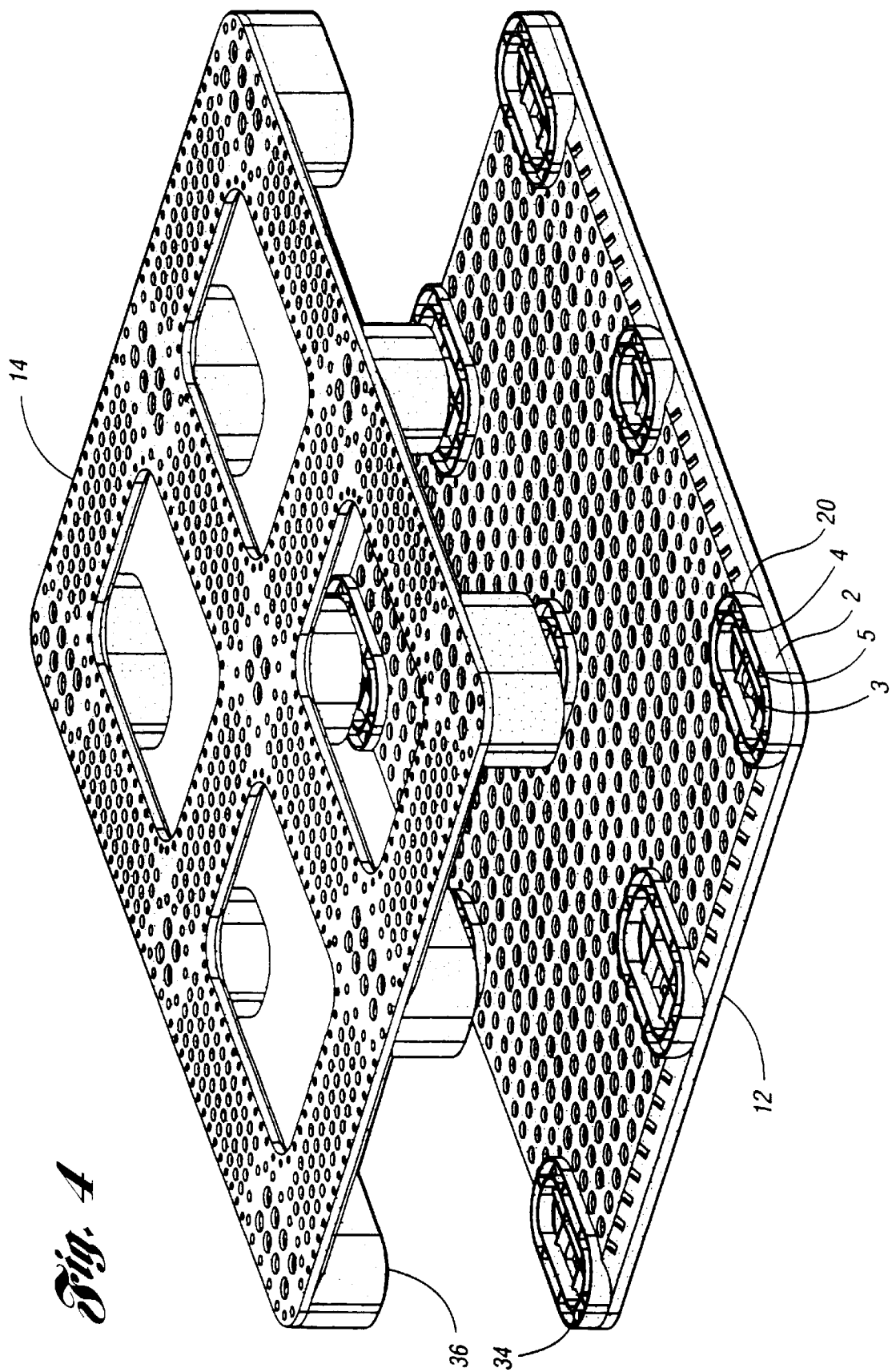
FIG. 4 is a bottom perspective view of the pallet assembly, showing the bottom deck and the top deck.

FIG. 3 is a semi-exploded view of pallet assembly 10 showing top deck 12 and bottom deck 14 spaced apart from each other and separated at parting line 20. Parting line 20 is a plane defined by the mating top and bottom column portion surfaces 34 and 36, respectively. It is the mating column portion 34 and 36, and more particularly mating column surfaces 35 and 37, which are plasticized and joined together in order to assemble pallet assembly 10 according to the present invention, as discussed further herein. As can also be seen by reference to FIG. 3, column portions 16, 18, 19 and 32 are each designed as having a closed section or box section for achieving the objects and goals set forth herein. FIG. 4 illustrates a semi-exploded bottom perspective view of pallet assembly 10 showing bottom deck 14 and top deck 12 spaced apart at parting line 20 and again showing from a different angle mating column portions 34 and 36.

Figure 5:
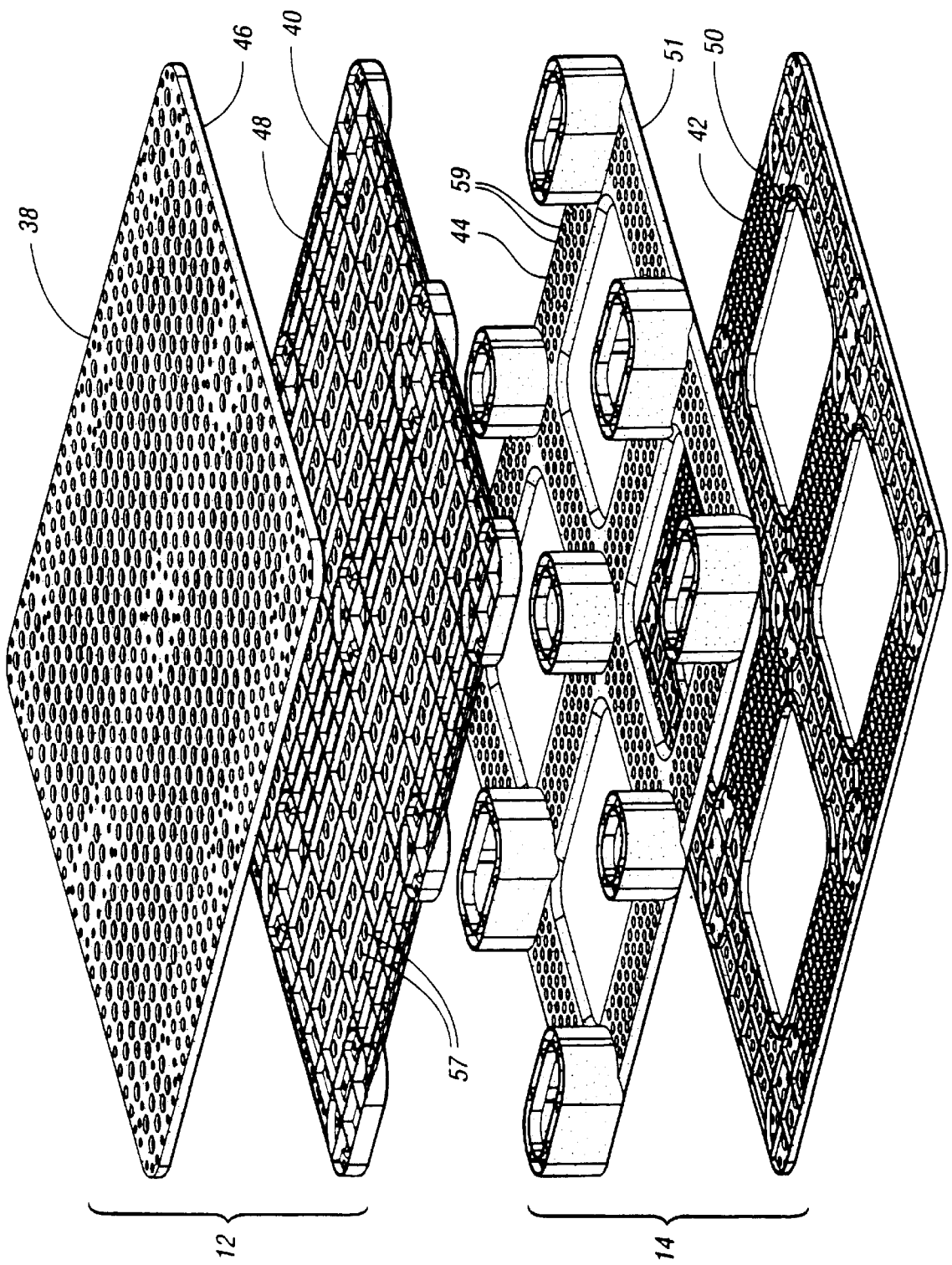
FIG. 5 is another exploded top perspective view of the pallet assembly showing the upper member, the first intermediate (mid-top) member, the second intermediate (mid-bottom) member and the bottom member of the pallet assembly.

FIG. 5 is yet another exploded top perspective view of pallet assembly 10. More specifically, FIG. 5 illustrates a fully exploded top perspective view of pallet assembly 10 wherein top deck 12 and bottom deck 14 are each shown as separated into the preferable four principal pallet assembly 10 components. As shown therein, top deck 12 has a top member 38 (also referred to as first member or first outer member) and a mid-top member 40 (also referred to as first (or top) intermediate member or first inner member.) Further, bottom deck 14 has a bottom member 42 (also referred to as second member or second outer member) and a mid-bottom member 44 (also referred to as second (or bottom) intermediate member 44 or second inner member.) Again, as more fully disclosed later herein, it is contemplated that top member 38 and mid-top member 40 are coupled together to form top deck 12 by plasticizing mating surfaces via the same or similar processes used to join top deck 12 to bottom deck 14. Similarly, it is contemplated that bottom member 42 and mid-bottom member 44 are also joined together to form bottom deck 14 via a similar process.

As further illustrated in FIG. 5, top member 38 includes upper surface 26 upon which objects are placed to be transported or stored. Hence, it is the surface of top member 38 which is opposite upper surface 26—referred to as top member lower surface 46 (best shown in the bottom perspective exploded view of FIG. 6)—which is adjoined to a mating planar upper surface 48 of mid-top member 40 via the disclosed plasticizing process in order to form top deck 12. As previously discussed, bottom member 42 includes bottom surface 28 for resting on floors and other resting surfaces. The surface of bottom member 42 which is opposite bottom surface 28—referred to as bottom member upper 50—is attached to a corresponding mating lower planar surface 51 of mid-bottom member 44.

Figure 6:
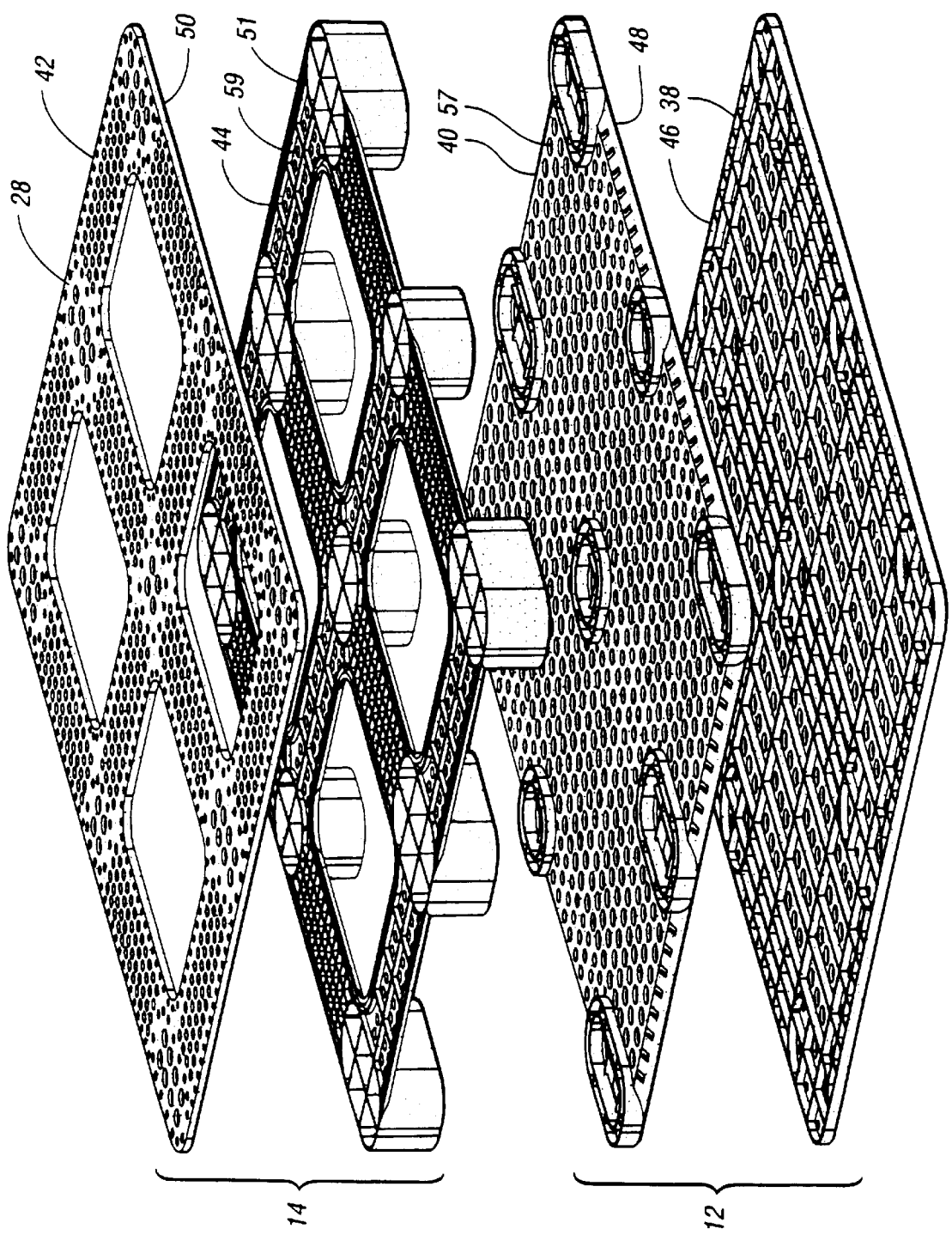
FIG. 6 is a bottom perspective view of a pallet assembly, showing the bottom member, the second intermediate member, the first intermediate member and the upper member of the pallet assembly.

FIG. 6 is a fully-exploded bottom perspective view of pallet assembly 10 illustrating its four components, as previously discussed in association with FIG. 5. These features are all shown in FIG. 14.

Figure 7:
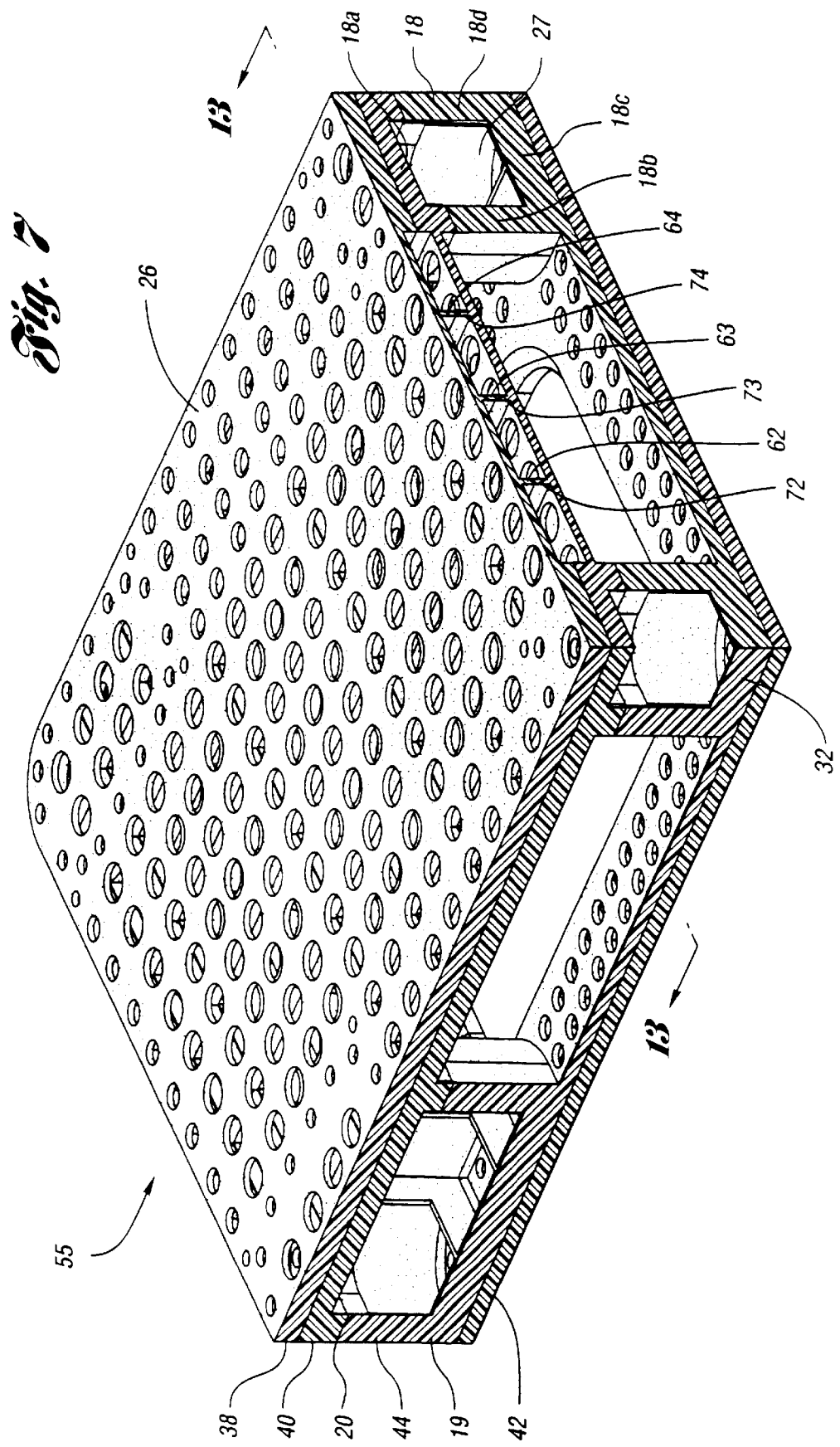
FIG. 7 is a top perspective view of a quarter section of the pallet assembly according to the present invention.
Figure 12:
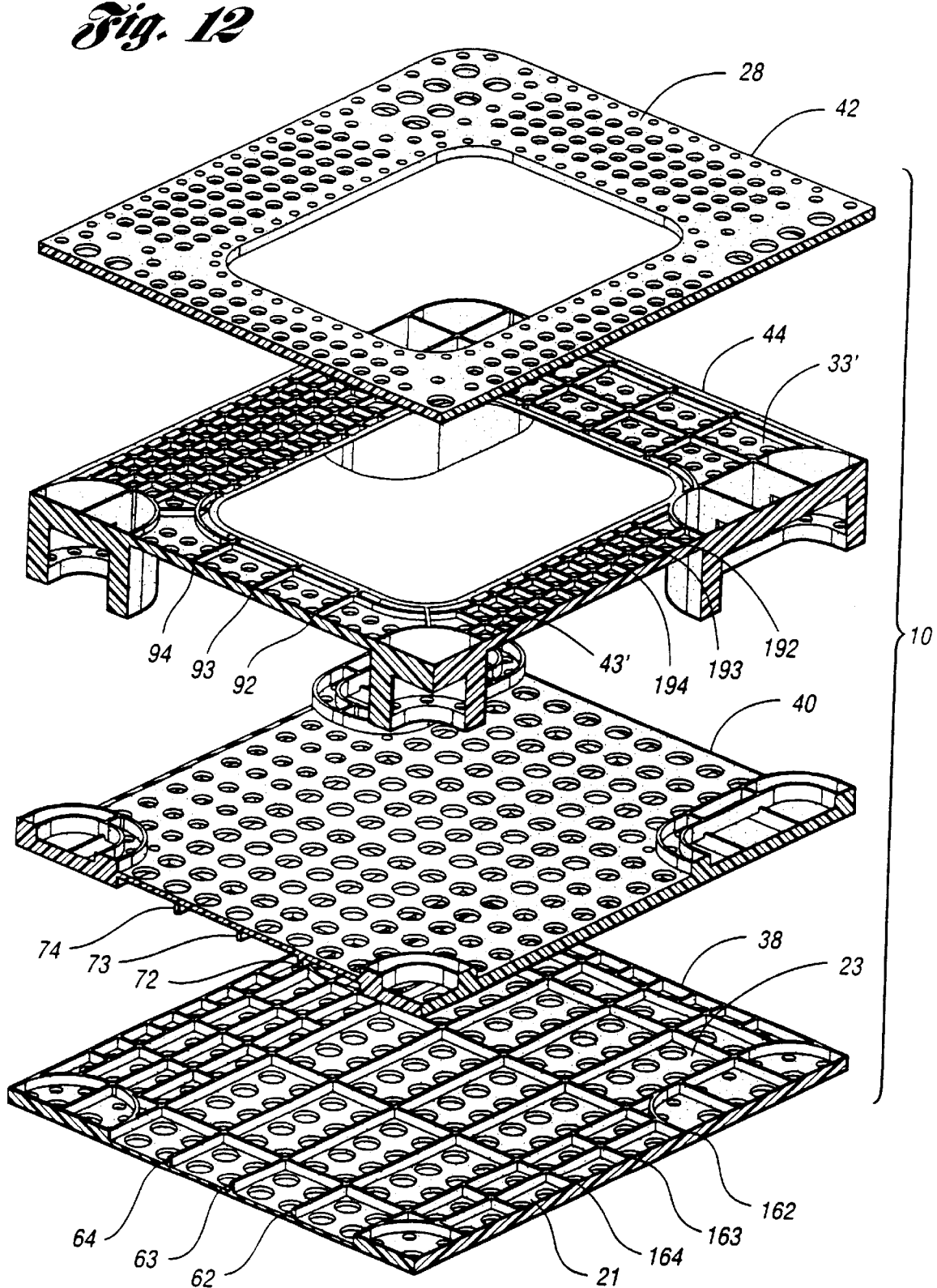
FIG. 12 is a bottom perspective view of the quarter section of the pallet assembly, showing the bottom member, the second intermediate member, the first intermediate member and the upper member of the pallet assembly.
Figure 13:
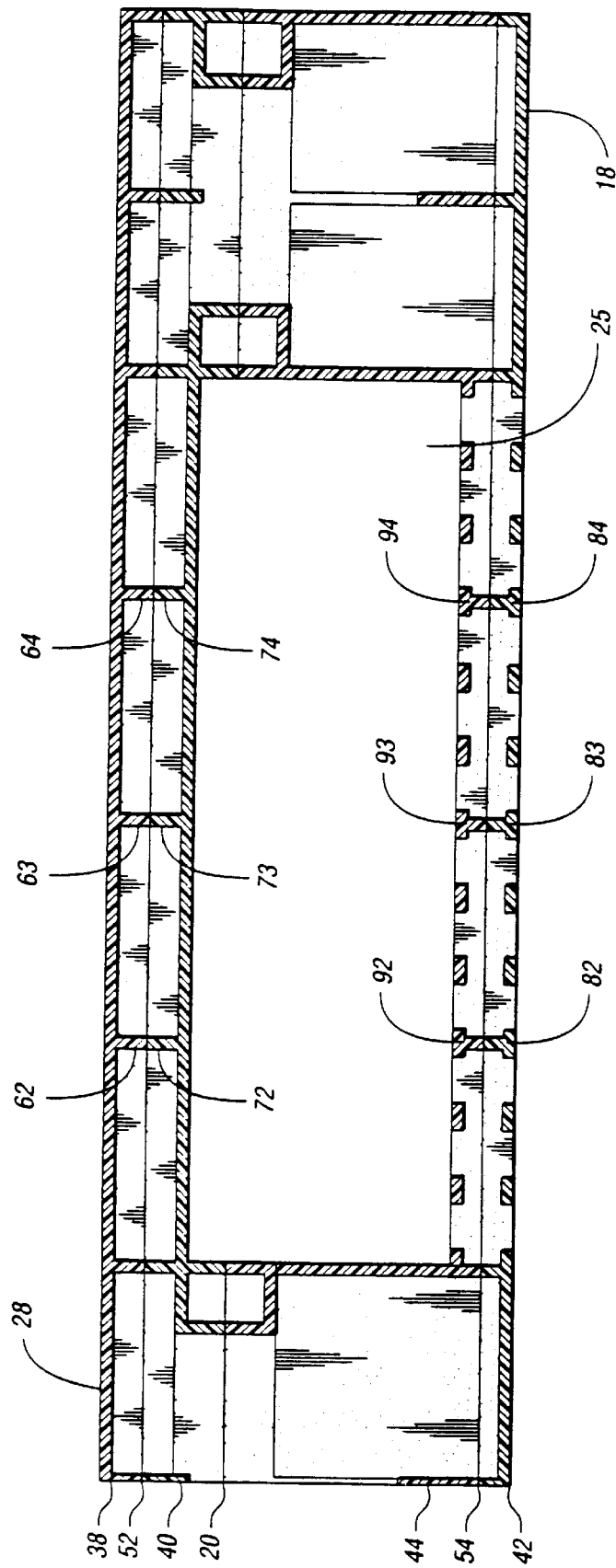
FIG. 13 is a sectional view of the pallet assembly taken along line 13—13 of FIG. 7.

Referring now to FIGS. 7, 12, and 13, a quarter section 55 of pallet assembly 10 particularly illustrates the cross-sectional box-beam shape disclosed herein according to the present invention. As illustrated in FIGS. 7, 12 and 13, a representative box beam section is shown for top deck 12, the box beam section defined by upper surface 26, mid-top member planar surface 41, and mating flange pairs 62–72 and 63–73 which are each fastened together. Another representative box beam section is shown defined by surfaces 26 and 41 and mating flanges pairs 63–73 and 64–74 which are each fastened together.

FIG. 13 illustrates bottom deck 14 having a representative box beam section which is defined by bottom surface 28, mid-bottom surface 45, and mating flange pairs 82–92 and 83–93 which are also each fastened together, and another representative box beam section further defined by surfaces 28 and 45, and mating flange pairs which are fastened together, these being pairs 83–93 and 84–94. In keeping with the invention, the preferred fastening means is via hot plate welding. However, any suitable fastener may of course be used depending on the application, including without limitation infrared radiation, epoxy, etc.

Also, note that box beam sections are included with respect to the column portions of pallet assembly 10, which include representative central column portion 32, side column portion 18 and end column portion 19. For example, the cross-section through side column portion 18 as shown in FIG. 7 illustrates the presence of a box beam section, shown as four wall portions 18a, 18b, 18c and 18d, defining therein a rectangular aperture 27 therethrough. Also, with further reference to FIG. 3, note that box beam sections are disclosed throughout the column portions, for examples defined by wall members 2, 3, 4, and 5 of column 20. Under equivalent applied loads, the box beam design disclosed herein has improved deflection and strength properties over a conventional ribbed pallet design having a ribbed support structure (such as the T-rib or the inverted-U rib designs). For example, to accommodate for the lower stiffness, the T-rib would require approximately 17% increase in height compared to the box beam section.

Figure 11:
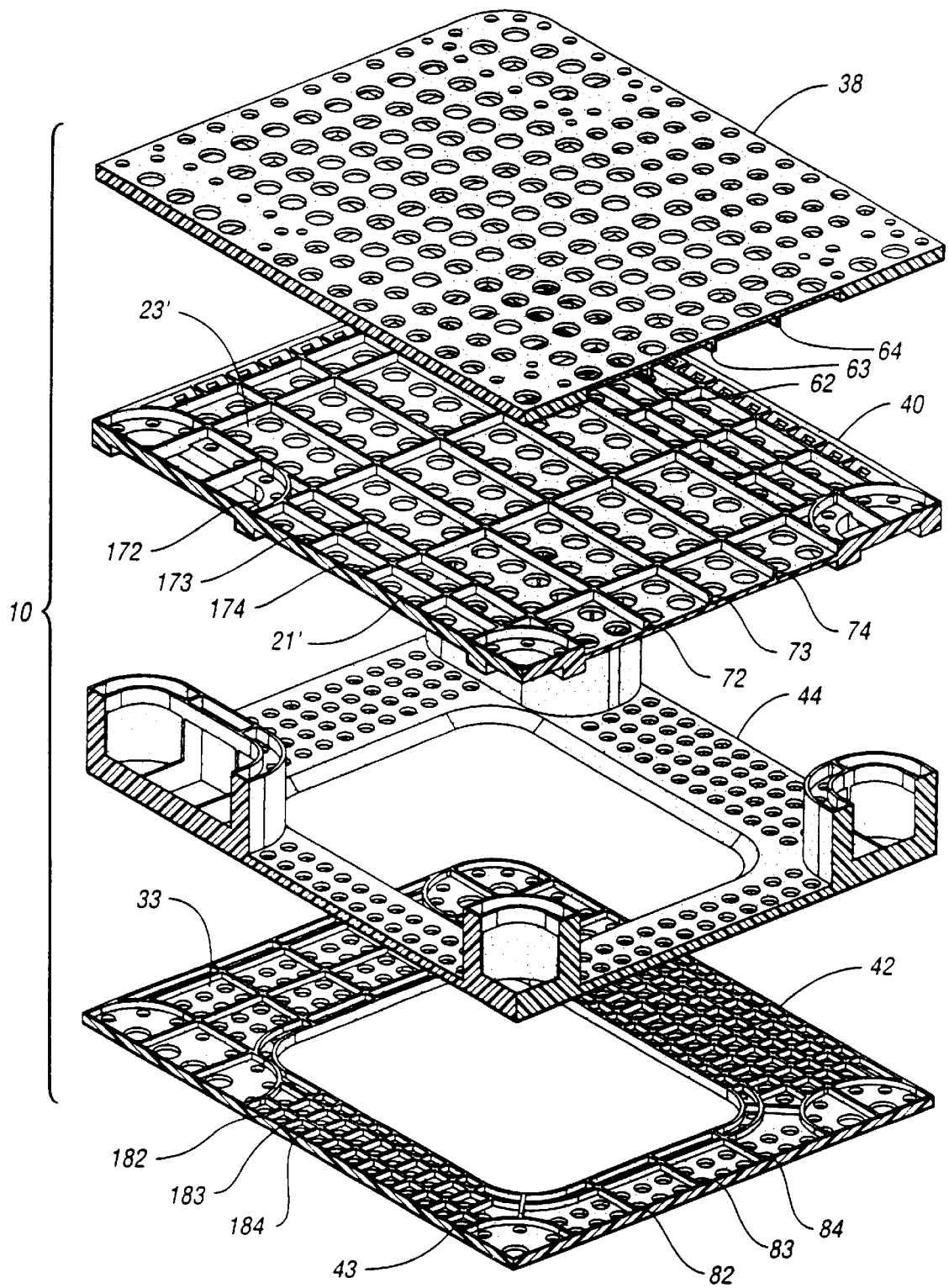
FIG. 11 is another exploded top perspective view of the quarter section of the pallet assembly showing the upper member, the first intermediate member, the second intermediate member and the bottom member of the pallet assembly.

With particular reference to the exploded perspective views of pallet quarter section 55 shown in FIGS. 11 and 12, note that mating flanges extend across top deck 12 and bottom deck 14, both longitudinally (for example, flanges 62, 72, 82, 92) and transversely (for example, flanges 162, 172, 182, 192) in a perpendicular orientation and pattern, in order define, when welded together, the plurality of box sections described heretofore. As shown in the exploded views of FIGS. 5, 6, 11 and 12, such box sections extend in a continuous manner across top deck 12 and bottom deck 14. More particularly with reference to FIGS. 11–12, note that the box sections of top deck 12 are relatively smaller box beam sections in the central and outer areas (for example, the box beam section defined by mating areas 21 and 21'), while they are relatively larger in the central portion of each of the four quarter sections, such as quarter section 55 (for example the box beam section defined by areas 23 and 23'.)

With continued reference to FIGS. 11–12, it is noted that this box beam section layout is similar for bottom deck 14, wherein it is noted that the box beam sections are relatively smaller and concentrated closer together in between openings 30, in order to provide greater strength to these areas, as is noted by the box beam section formed of welded mating areas 43 and 43'. On the other hand, larger box beam sections of bottom deck 14 are provided toward the outer edges, such as the section formed by welding mating areas 33 and 33'.

The box beam design for top deck 12, bottom deck 14, and the column portions disclosed herein also achieve properties similar to a solid pallet design, but of course, by definition the box beam uses less material and is therefore less expensive and lighter than its solid counterpart. Further, a conventional ribbed pallet design typically does not achieve the deflection or stiffness requirements of the box beam design according to the present invention, and would also require a reinforced or engineered resin and would need to be relatively taller to achieve the relatively high stiffness. The conventional design also would not meet the desirable properties of the design according to the present invention, given equivalent part weights, loads, and flexural modulii implemented in design comparisons.

Figure 8:
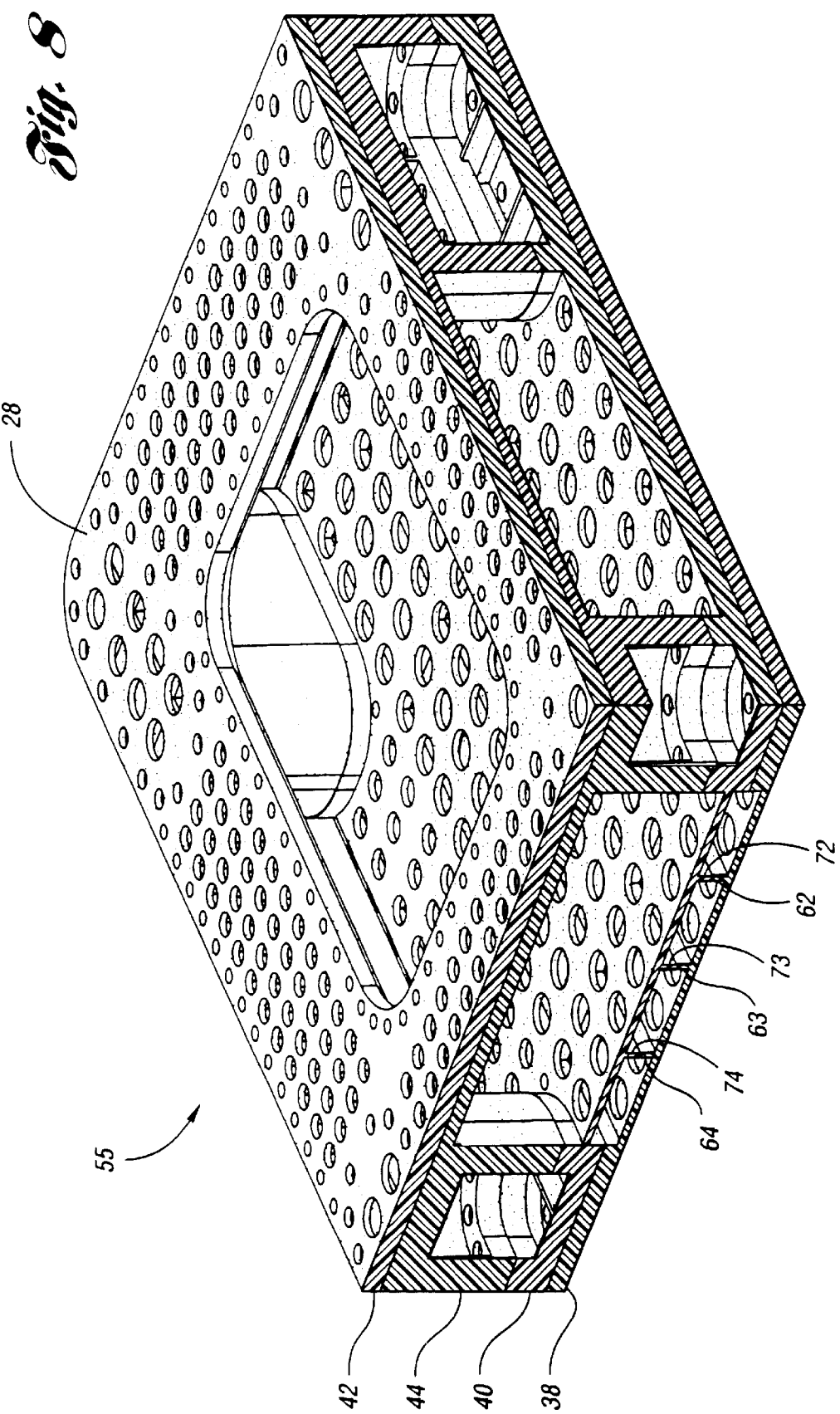
FIG. 8 is a bottom perspective view of the quarter section of the pallet assembly.

With reference now to FIG. 8 of the drawings, shown therein is a bottom perspective view of quarter section 55 shown in FIG. 7. FIG. 8 is similar to the full pallet bottom perspective view of FIG. 2, but as mentioned is a quarter section 55 of full pallet assembly 10.

Figure 9:
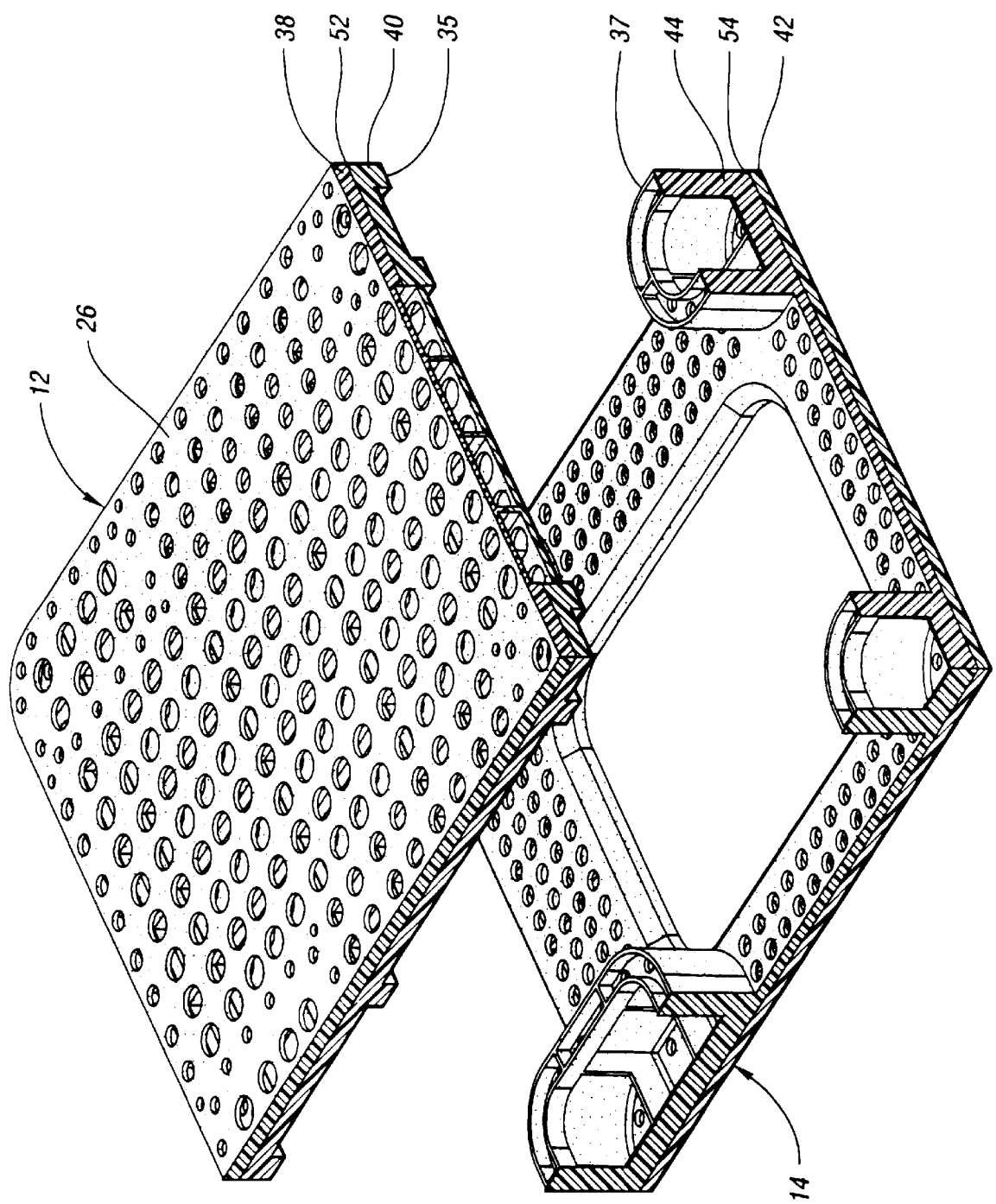
FIG. 9 is an exploded top perspective view of the quarter section of the pallet assembly, showing the top deck and bottom deck.
Figure 10:
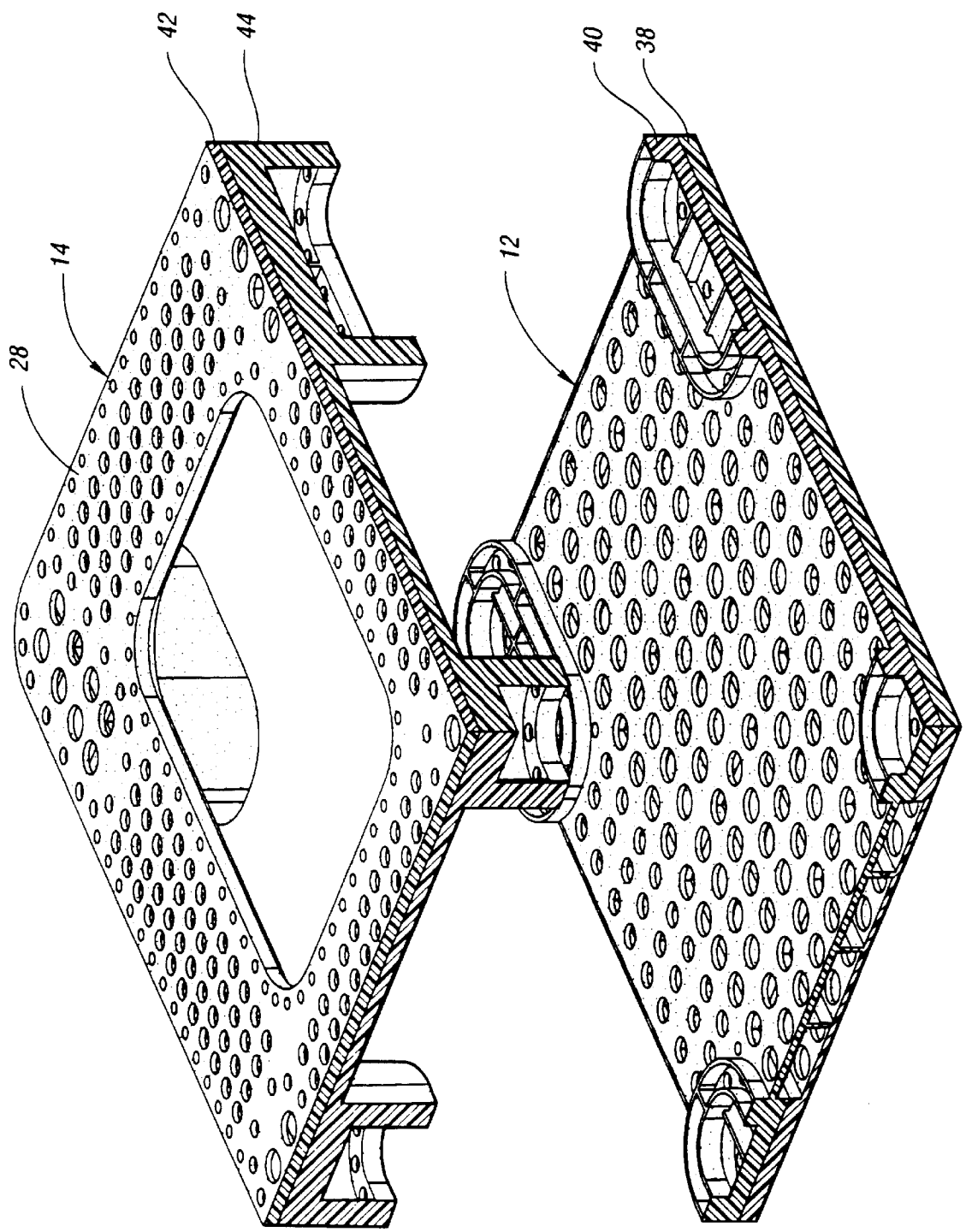
FIG. 10 is a bottom perspective view of the quarter section of the pallet assembly, showing the bottom deck and the top deck.

FIG. 9 shows the top perspective view of quarter section 55 from FIG. 7 exploded into top deck 12 and bottom deck 14. This quarter section view is similar to the corresponding bottom perspective view of the full pallet illustrated and disclosed previously in association with FIG. 3. Likewise, FIG. 10 is an exploded view of a bottom perspective view of quarter section 55 shown in FIG. 8 exploded into bottom deck 14 and top deck 12. This view is similar to the corresponding perspective view of full pallet bottom of FIG. 4.

FIG. 11 is yet another fully exploded view of the top perspective view of quarter section 55 shown in FIG. 7, showing the various members included in pallet assembly 10, which are top member 38, mid-top member 40, bottom member 42 and mid-bottom member 44. This view is similar to the full pallet exploded perspective view of FIG. 5. Similarly, FIG. 12 is another fully exploded view of the bottom perspective view of quarter section 55 of FIG. 8 showing the various components included in the pallet assembly 10. Similar to the full pallet fully exploded perspective view of FIG. 6.

FIG. 13 is a cross-sectional view of quarter section 55 of pallet assembly 10 shown in FIGS. 7–12. More particularly, FIG. 13 is an elevational view of pallet quarter section 55 taken along centerline line 13—13 of FIG. 7. While the various members 38, 40, 42 and 44, in a preferred embodiment, are formed of a like material, for ease of reference, these members are illustrated as having different crosshatching in order to easily demarcate between the walls of the various members as shown in this cross-section. As in FIG. 7, the closed or box-beam cross-section of the column portions is apparent from FIG. 13, represented by side column portion 18.

Figure 14:
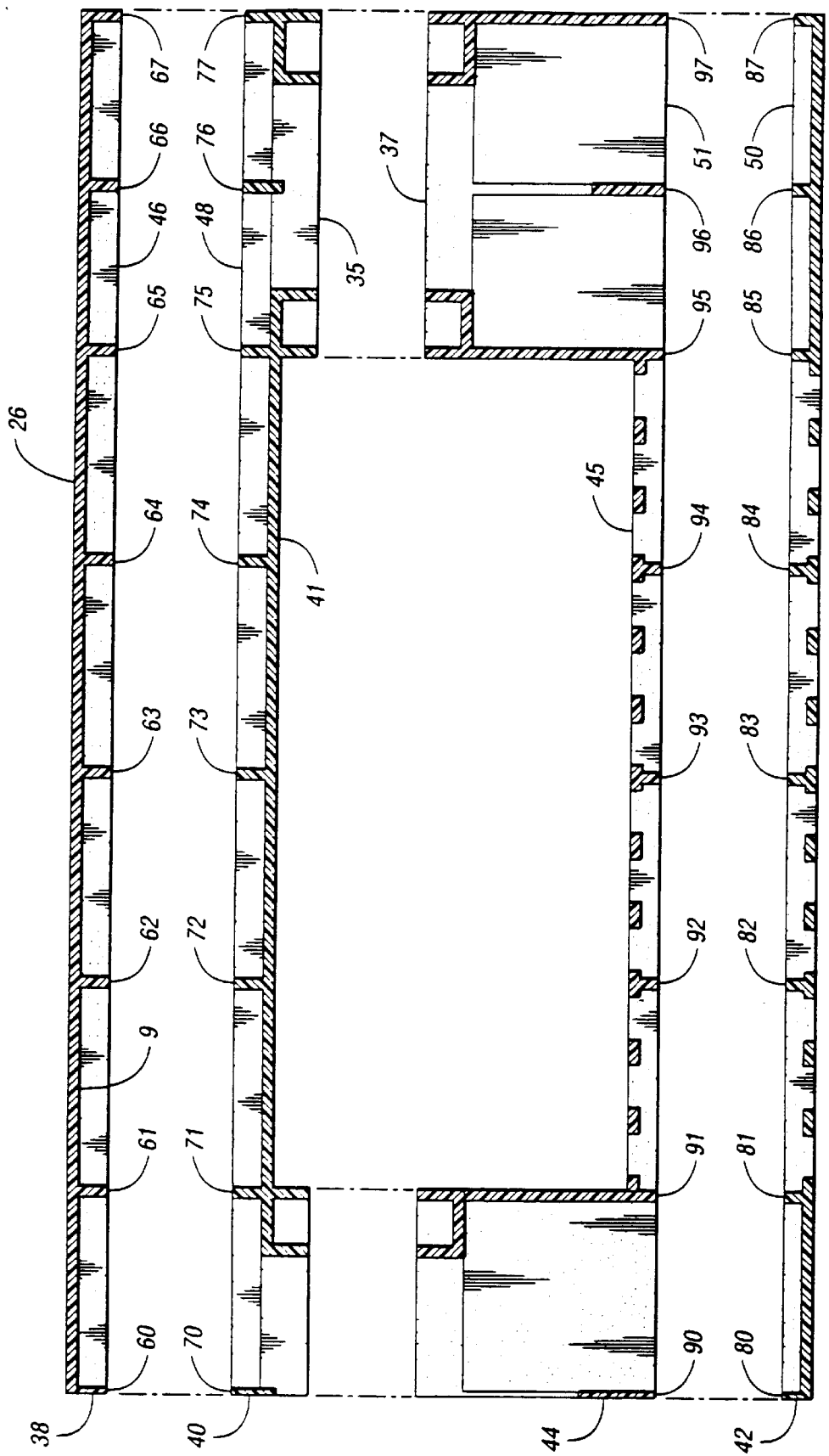
FIG. 14 is an exploded side elevational sectional view as shown in FIG. 7, with the top member, mid top member, mid bottom member and bottom member shown separated.
Figure 15:
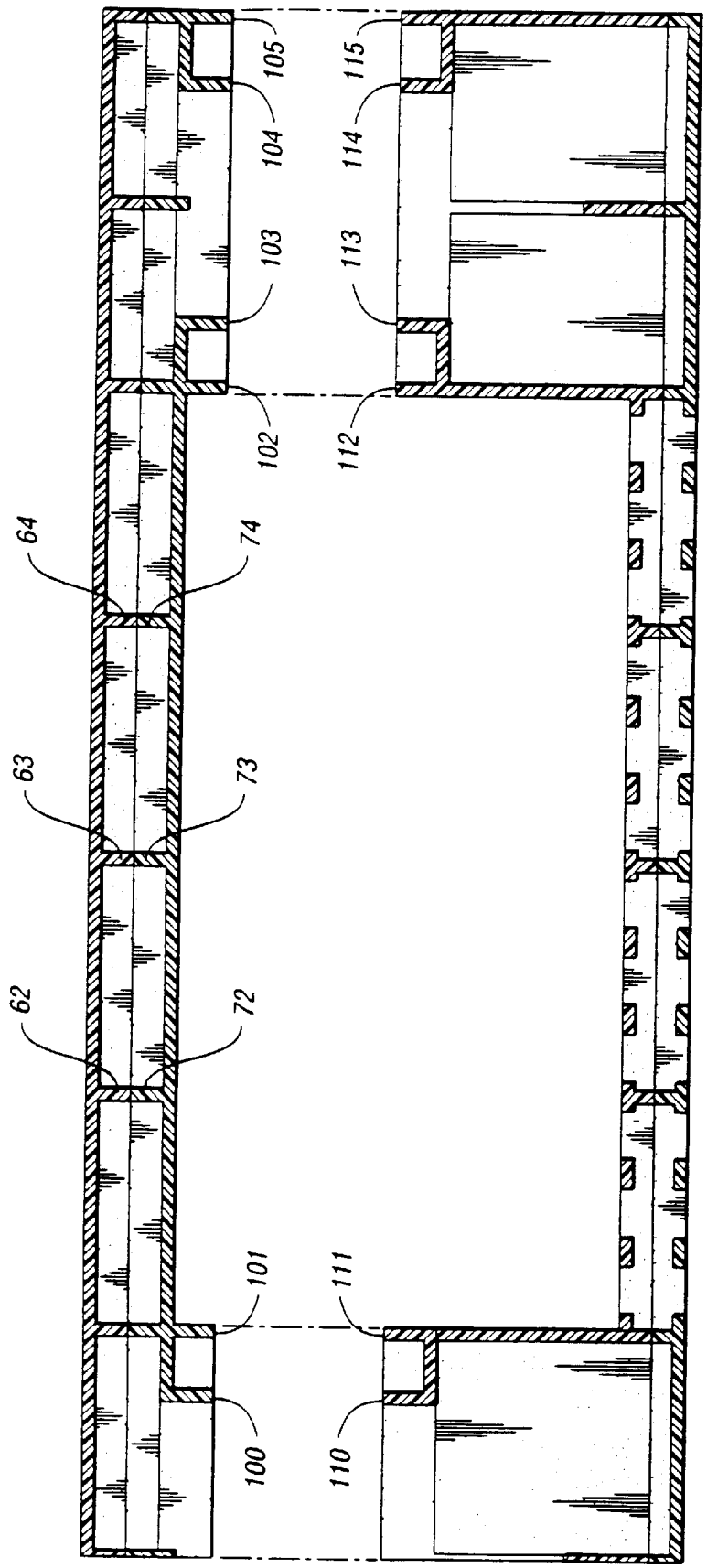
FIG. 15 is another exploded side elevational sectional view of FIG. 7, showing the top deck and bottom deck separated.

Particularly, FIGS. 13–15 illustrates the mating portions of pallet assembly 10 which are plasticized and joined according to the present invention, and particularly assembled via the hot plate welding process as discussed further herein. Note that in addition to parting line 20 between top deck 12 and bottom deck 14, there are two additional parting lines shown, those being an upper parting line 52 defined by a plane between top member 38 and mid-top member 40, and a bottom parting line 54 defined by a plane between bottom member 42 and mid-bottom member 44. Parting lines define the respective weld planes according to the present invention.

According to the present invention, each of the adjacent and adjoining members of pallet assembly 10 are preferably joined together at the planar surfaces or portions which define the corresponding parting lines 20, 52 and 54. With reference to FIG. 14, it is noted that parting line 20 is defined by mating planar surfaces 35 and 37; upper parting line 52 is defined by mating planar surfaces 69 and 79; and lower parting line 54 is defined by mating planar surfaces 50 and 51. As best illustrated in the sectional view of FIG. 15 shown having top deck 12 and bottom deck 14 spaced apart, it is shown that the corresponding mating ribs 100–105 of top deck 12 and ribs 110–115 of bottom deck 14 are plasticized and welded together, preferably via the hot plate welding process. Similarly, as shown in the full exploded view of FIG. 14, the members forming top deck 12 and bottom deck 14 are similarly welded together at their corresponding mating ribs. Therefore, with reference again to FIG. 14, ribs 60–67 of top member 38 and ribs 70–77 of mid-top member 40 are melted or plasticized, preferably during the hot plate welding process, and welded to their mating corresponding ribs. Therefore, the flanges or ribs extending downward from top member 38 (flanges 60, 61, 62, 63, 64, 654, 66 and 67) are heated to a melted state and joined, respectively, with mating flanges 70, 71, 72, 73, 74, 75, 76 and 77, respectively, which extend upward from mid-top member 40.

Similarly, the components forming bottom deck 14 are joined in the same fashion, so that integrally molded flanges 80, 81, 82, 83, 84, 85, 86, 87 (80–87) which extend upward from bottom member 42 are heated to a plasticized state and pressed together with respective opposed mating integrally molded flanges 90, 91, 92, 93, 94, 95, 96, 97 (90–97), respectively, extending downward from mid-bottom member 44. After top deck 12 and bottom deck 14 have each been joined or welded, FIG. 15 shows that top deck 14 is then welded to bottom deck 12 in a similar fashion, wherein integrally molded ribs or flanges 100, 101, 102, 103, 104, 105, and their respective integrally molded opposed mating flanges 110, 111, 112, 113, 114, and 115 are heated to a melted state and then pressed together via the hot plate welding process in order to form pallet assembly 10. Note that the welds according to the teachings of the process should be cooled before pallet assembly 10 may achieve its optimum physical properties, including strength and load-bearing characteristics.

Figure 16:
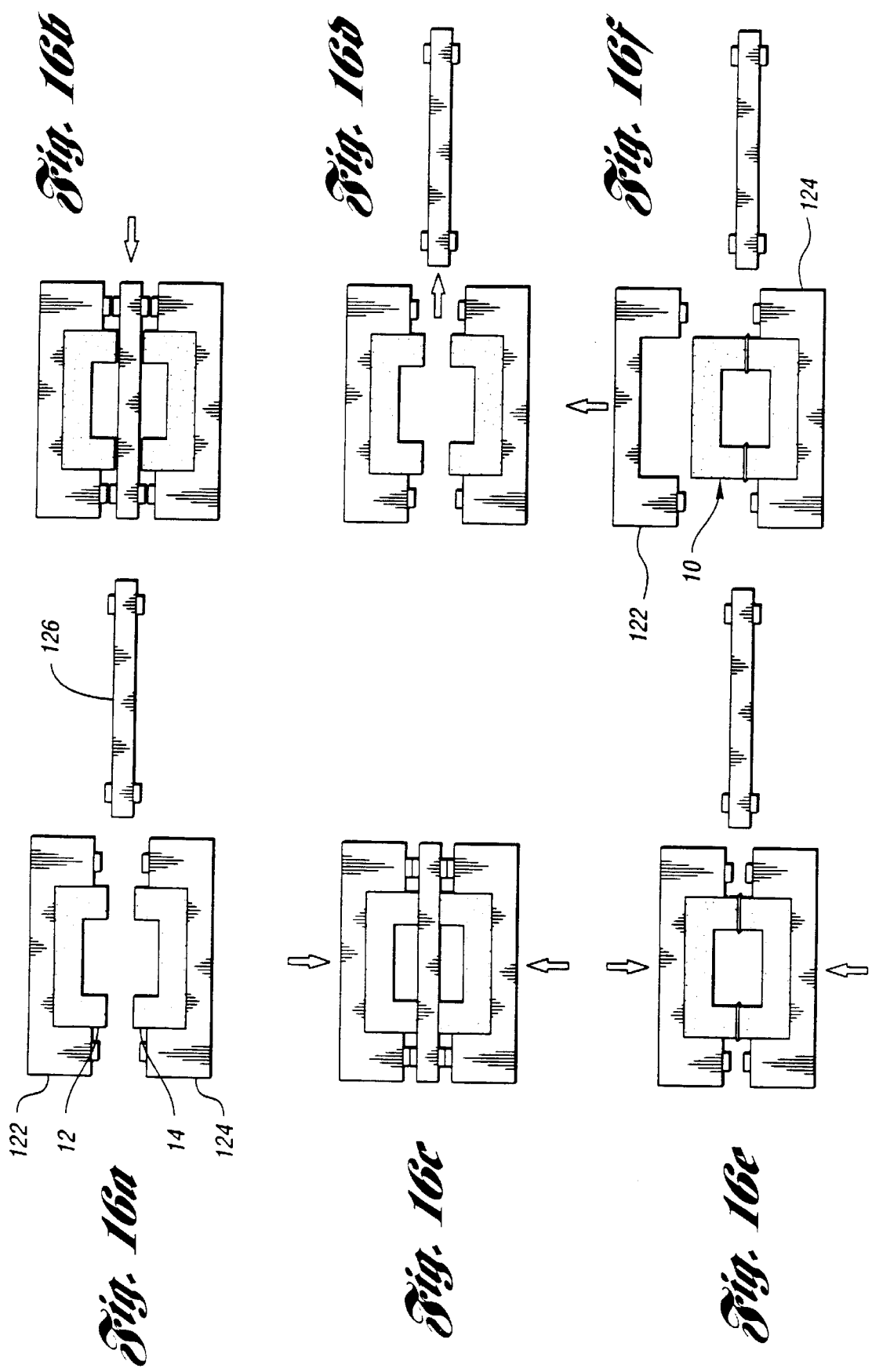
FIGS. 16a–f illustrate the method according to the present invention of forming and assembling the pallet assembly.

Focus is now directed to the method of assembling pallet assembly 10 according to the present invention. The preferred manufacturing assembly process is by the hot plate welding process which is best illustrated in FIG. 16 of the drawings. As indicated above, however, any suitable fastening means may be used such as, for example, infrared radiation, epoxy, etc. The hot plate welding process may be characterized as either contact hot plate welding or non-contact hot plate welding. This process should provide weld strength properties and produce seals between the mating (welded) components as strong as those of the parent polymer. According to the present invention, the weld surfaces, shown as ribs 60–67, 70–77, 80–87, 90–97, 100–105 and 110–115, are either placed in contact (in the contact hot plate welding process) or closely approach (in the non-contact variation) a heated platen 126 (preferably formed of steel) or similar tool in order to create a molten or plasticized region on the aforementioned ribs. Platen 126 is then moved out of the way and the plasticized regions are then pressed together to form the weld.

More particularly, in practice, the process is operated on a hot plate welding machine (known in the art) in which the corresponding pallet members which are to be welded together are clamped in holders 122 and 124. Platen 126 of welding machine, which is heated to a predetermined desirable temperature, advances between the separated mating parts (for example top deck 12 and bottom deck 14), whereupon the weld planes of the pallet members to be welded are either pressed against platen 126 (contact version using conducted heat) or are moved closely to it (non-contact version using radiant heat.) The choice of which method to use is dependant on many factors including the properties of the materials to be welded; cycle times required; size and design of the component; accuracy and repeatability of the welding machine; and use of the welded component.

In the contact hot plate welding process, heat is conducted by way of physical contact of the parts to be welded with heated platen 126. Further, the surface of each mating pallet member is plasticized or melted until contact is complete (referred to in the art as "matching"). At this point, further platen 126 movement is often halted, and heating is continued, in order to create a deeper (to a predetermined depth), and relatively more molten, plasticized zone in which material is displaced. In the non-contact process, radiant heat is applied to the parts to be welded which is generated by holding the parts to be welded very close to the heated platen (target plates) and allowing them to heat over time.

For either version, after heating is complete and the surface melting has reached a predetermined melt depth, the parts are retracted from platen 126. Platen 126 is then moved out of the way, whereupon the adjoining pallet members (for example, top deck 12 and bottom deck 14) are forged together and held until the polymer of the plasticized pallet member surfaces cools. Mechanical or microprocessor-controlled stops may be used to control the amount of material displacement of the pallet polymer from the weld zone, particularly during the heating phase. Of course, as previously stated, the process disclosed herein is applicable to join top deck members 38 and 40, and bottom deck members 42 and 44.

If polymers between adjoining pallet members are compatible, the hot plate welding process is capable of welding dissimilar thermoplastics with the use of two platens which compensate for the different polymer melting or softening points. Hot plate welding is preferably used with standard unfilled polymers and is preferably used in this manner according to pallet assembly 10 of the present invention. However, hot plate welding may be used to assemble pallet assembly 10 with filled polymers, provided that the filler material allows the polymer to interdiffuse upon forging.

Weld times to form pallet assembly 10 may vary with the volume of polymer to be fused and the thermal conductivity of the respective pallet member. Accordingly, welding times for pallet assembly 10 may fall in the range from 5 to 60 seconds, although the mass of pallet members that are to be plasticized and the corresponding cooling rates will govern cycle times. The size of pallet assembly 10 that may be hot plate welded according to the present invention is limited only by the practical size of holding fixtures 122 and 124 and platen 126 of welding machine, and also of the mechanics of the removal of the welded assembly or subassembly from the weld zone and moving pallet assembly 10 components for forging them together.

Each of the contact and non-contact methods have their advantages, including: In the non-contact method, no special coating on platen 126 is required for material release, no residue builds-up on platen 126, there is no loss of weld edge material against heated platen 126 and finished parts have consistent weld characteristics. Whereas, the advantages of contact heating are a quicker cycle time, lower temperature required for platen 126, the method is more tolerant of larger design components, such as the pallet member disclosed herein, and also more tolerant of less dimensionally consistent components.

As shown in FIG. 16*a*, the hot plate welder has part holding fixtures 122 and 124 attached thereto. The parts to be welded, for example and not limitation, top deck 12 and lower deck 14 are secured to their respective holding fixture 122 and 124. With reference to FIG. 16*b*, platen 126 extends into and is inserted between pallet members 12 and 14 which are to be welded. Holding fixtures 122 and 124 move toward each other and toward platen 126. If contact welding is desired, as shown in FIG. 16*c*, holding fixtures 122 and 124 approach platen 126 until the surfaces of decks 12 and 14 which are to be welded (surfaces 35 and 37.)

If non-contact welding of pallet assembly 10 is desired, then FIG. 16*c* is disregarded and surfaces 35 and 37 of decks 12 and 14 do not contact platen 126. As shown in FIG. 16*d*, after a predetermined period of time, holding fixtures 122 and 124 begin to separate and platen 126 is withdrawn from between fixtures 122 and 124. With reference to FIG. 16*e*, fixtures 122 and 124 again move toward each other to a weld position, so that the mating surfaces of top deck 12 and bottom deck 14 are touching. Top deck 12 and bottom deck 14 are held at this final weld position for a predetermined period of time until the weld material is stable and allowed to cool. Finally, with reference to FIG. 16*f*, fixtures 122 and 124 are separated to their part loading position and welded pallet assembly 10 is held to one of the fixtures (shown in FIG. 16*f* as fixture 124) for unloading. The part is then removed from the welding machine.

Welding pallet assembly 10 as described herein provides a high strength weld suitable for parts operating under pressure. The joint parting lines 20, 52 and 54 are relatively inconspicuous. Further, no other attachment methods, such as adhesives, solvents, mechanical fasteners such as nails or staples, are required. Also, complex shapes such as top deck 12 and bottom deck 14 can be welded since there is no relative motion required in the welding process.

Another assembly process known as infrared radiation may also be used as a non-contact alternative to hot plate welding for use in forming and assembling pallet assembly 10 according to the present invention. In such a process, the infrared radiation is often supplied by high intensity, quartz heat lamps which produce radiation having wavelengths of around one micron. As with hot plate welding, when this radiation is applied to planar surfaces 35, 37, 46, 48, 50, 51 and of assembly 10, plasticizing occurs. In one application, radiation source, such as heat lamps, are removed after melting has occurred and the parts are forged together just as with the platen in hot plate welding. Infrared welding tends to melt the zone relatively quickly. Hot plate welding uses conduction to create the necessary plasticized zone. Of course, as with any other process, the depth of penetration of the plasticization depends on many factors and it varies strongly with only minor changes in polymer formulation.

Focus is now directed to the load-bearing properties of pallet 10. In a racking scenario, pallet 10 is supported from below on two opposing edges and loaded from above on upper surface 26 of top deck 12. Pallet 10 should support this load with a minimum of deflection. According to standard beam formulas known in the art, it is recognized that deflection increases as the load or the span distance increases, and decreases as the material modulus (E) or section moment of inertia (I) increases. Since the load and the span are defined for a given application, the variables used to minimize deflection are the material and the section design.

Generally, as the E value increases for a given material, the impact strength decreases. There exist engineered materials that may solve these problems but they are too expensive for wide spread use. The most common method is to use a commodity resin such as polyethylene or polypropylene and add a filler to stiffen the resin. However, fillers add weight and reduce impact strength for a given material as well as impact the recyclability in some cases, and add cost. Preferably, a pallet would use a commodity resin because of cost, weight, and impact strength. Accordingly, optimizing the design of the pallet is the preferred method to achieve improved pallet performance.

As previously noted, for a given section geometry the highest I value is for a solid section. For instance, in pallet assembly 10, the stiffest top deck 12 design is one that is solid plastic, but this is impractical because of weight and cost. Most designs attempt to overcome this by using ribbed sections instead of solid sections to minimize the loss of I and reduce the weight to an acceptable level. Another method is to use foaming agents along with the ribs to minimize the weight of the ribs and improve the I value. Both methods have a limit to their effectiveness. Namely, ribs are not the ideal geometry to maximize the I value and while foaming improves this slightly, it also reduces the impact strength of the material.

Generally, for a given section the material closest to the neutral axis or center has the least affect on I and the material farthest away has the greatest effect. In other words, a hollow or I-beam section is stiffer than a rectangular section of equal height and area. Thus, pallet 10 design according to the present invention defines hollow or boxed sections throughout the pallet and in a continuous manner. Conventional injection molding techniques make this virtually impossible. Therefore, using a 3-step fastening operation (preferably welding) results in box beam pallet 10 formed from four individual component members, 38, 40, 42, 44, which are preferably injection molded.

In summary, the first or top member 38 preferably includes a substantially flat top surface with ribs protruding in a downward direction. The second or mid-top member 40 has a substantially flat bottom surface with ribs extending in an upward direction and partial support columns extending down from this surface. The ribs on both these parts are aligned so they can be welded together by plasticizing their mating surfaces preferably via a hot-plate welding operation to form a box beam top deck. The third or mid-bottom member 44 has a substantially flat upper surface with ribs extending down and partial columns extending up. The fourth or bottom member 42 has a substantially flat bottom surface with ribs extending up. Again, the ribs on both parts are aligned so they can be welded together in a second hot plate welding operation to form box beam bottom deck 14. Lastly, the box beam top deck and box beam bottom deck are welded together at the columns (16, 18, 19, 32) that also align, resulting in a pallet where every section is a box beam. Note that the order of the plasticizing procedure is provided for illustrative purposes only, and of course, such steps may be performed in any feasible order.

Of course, it is also contemplated according to the present invention that the box beam sections may be formed by one planar surface being ribbed area defining a U area (for example in FIG. 14, between top member 38 and mid-top member 40, ribs 63, 64 and surface 9 define a U-area or a partial box-beam section) while the mating planar surface 48, instead of including ribs, would form a flat surface, thereby creating a fourth wall which closes out the U area and defines a box section. Again, of course, this would apply to all surfaces to be hot plate welded according to the present invention.

In the preferred embodiment, each boxed section has a plurality of perforations or apertures 22,24 in the top and bottom decks to allow for cleaning and drainage. These perforations may easily be eliminated to create true boxed sections. More particularly, apertures 22 in top member 38, apertures 57 in mid-top member 40, apertures 24 in bottom member 42, and apertures 59 in mid-bottom member 44 are tapered so that they increasingly get larger from top surface 26 to bottom surface 28, or from washing side to non-washing side, in order to provide for ease of water drainage through pallet 10 (see FIGS. 5–6.)

While other methods of forming plastic parts exist, these methods are not capable of forming the present design. For example, blow molding is limited to hollow sections and cannot create cross ribbing within the hollow sections to form the smaller boxed sections defined by the ribs of the present invention which assist in achieving the desired stiffness. Extrusion is also limited in that its hollow sections and internal ribs must be oriented in the same direction for a given component. Extrusions also have open ends that must be sealed in a secondary operation to create a "clean" pallet, and therefore is labor intensive and costly to produce.

It is noted that the design according to the present invention preferably includes full and continuous box-beam sections across the entire pallet 10, i.e. every section being fully boxed in: top deck 12, bottom deck 14 and columns 16, 18, 19, 32. The remarks and disclosure made herein with regard to material modulus (E), moment of inertia (I), section geometry, beam formulas, and stiffness, generally apply to all embodiments and features disclosed in this application.

With focus now on FIGS. 17–27, also disclosed according to the teachings of the present invention is a top frame 210 for a pallet. A top frame is typically used in connection with the mass shipping of objects, such as empty bottles (see FIG. 18). The top frame is used to help stabilize the top of a shipment of objects in conjunction with a pallet at the bottom of the shipment. Top frame 210 is preferably and generally symmetrical about each centerline, and is formed of thermoplastic or other polymeric material and is preferably, but not necessarily, formed of injection molded components.

Figure 17:
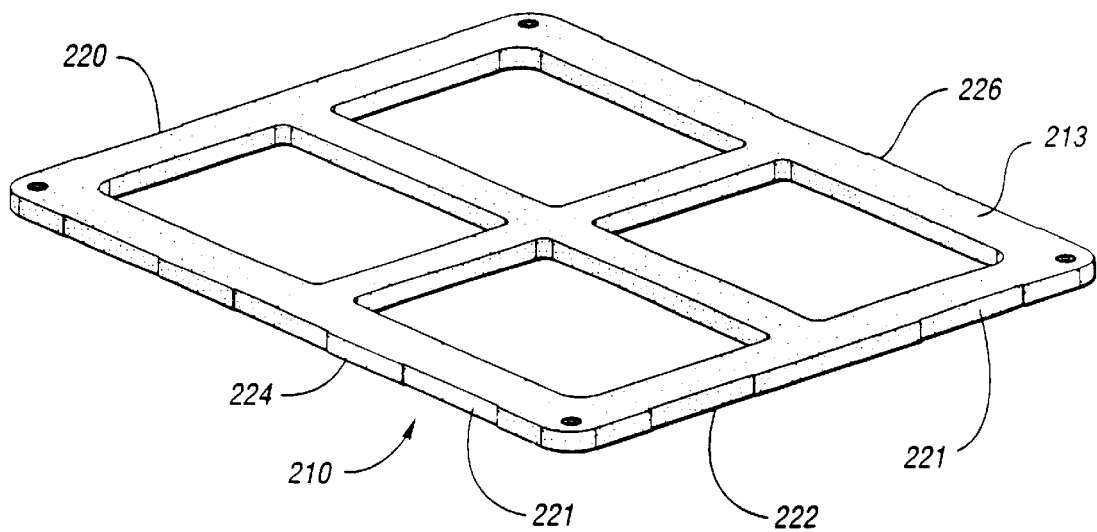
FIG. 17 is a perspective view of a top frame assembly according to the present invention.
Figure 18:
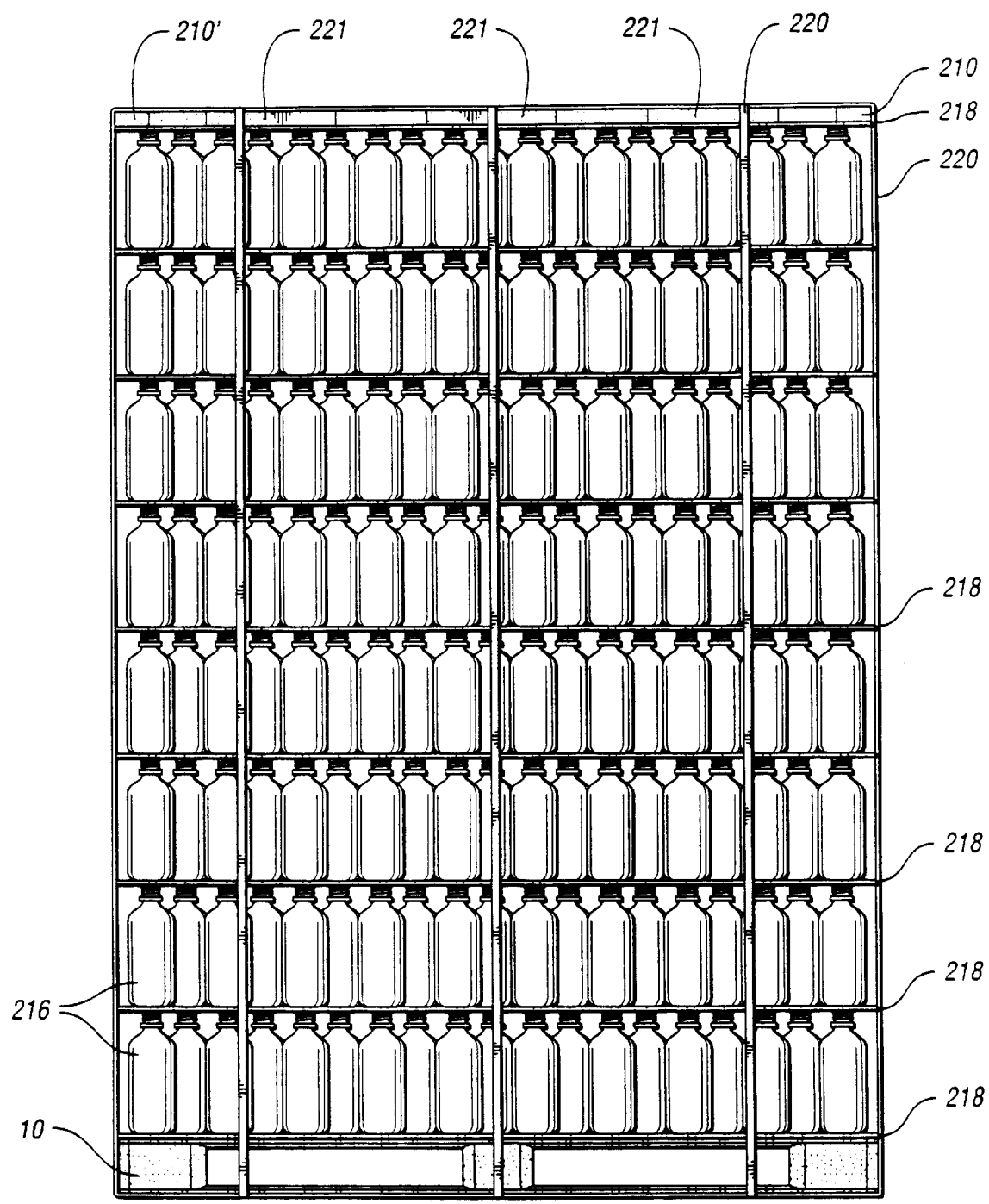
FIG. 18 is a side view of the top frame assembly in operation with the pallet assembly and having objects to be transported disposed therebetween.

Referring to FIGS. 17–27, shown therein is a top frame assembly 210 according to the present invention. The box beam design according disclosed herein for pallet 10 is also applicable to top frame assembly 210. FIG. 17 illustrates a perspective view of top frame assembly 210. Top frame assembly 210 includes a top (first) member 212 and a bottom (second) member 214 (see the exploded perspective views of FIGS. 25 and 26). FIG. 18 shows top frame assembly 210 in operation. As illustrated therein, a pallet such as pallet 10 according to the present invention, has loaded thereon a plurality of layers of objects for transport and storage. Such objects are shown in FIG. 18 as a plurality of empty bottles 216, but of course may be any of various objects which may be transported by and stored on pallet and to which the teachings according to the present invention would apply.

A first layer of bottles 216 is loaded on pallet 210. Typically, a planar member 218 is positioned on the upper surface of bottles 216. Planar member 218 may be referred to as a slip sheet in the art, and is typically formed of cardboard or fiberboard. As illustrated, another layer of bottles 216 may be disposed on top of planar member 218, and then another planar member 218 is positioned on top of that layer of bottles 216. This procedure is repeated for as many layers as is practical and desired, for example the eight layers of bottles shown in FIG. 18. After the final planar member is positioned, top frame 210 is positioned on top of the planar member so that the product is sandwiched. Pallet 10 and top frame 210, with the objects disposed therebetween, are strapped together via straps 220. As shown in FIGS. 17, 18, 19, and 26, top frame 210 preferably also includes a series of recesses 221 around its perimeter in which straps 220 are positioned so that they do not move or shift easily during shipment. Subsequently, the resulting packaging (as shown in FIG. 18) is typically covered and protected, such as by applying a shrink plastic wrap.

Figure 19:
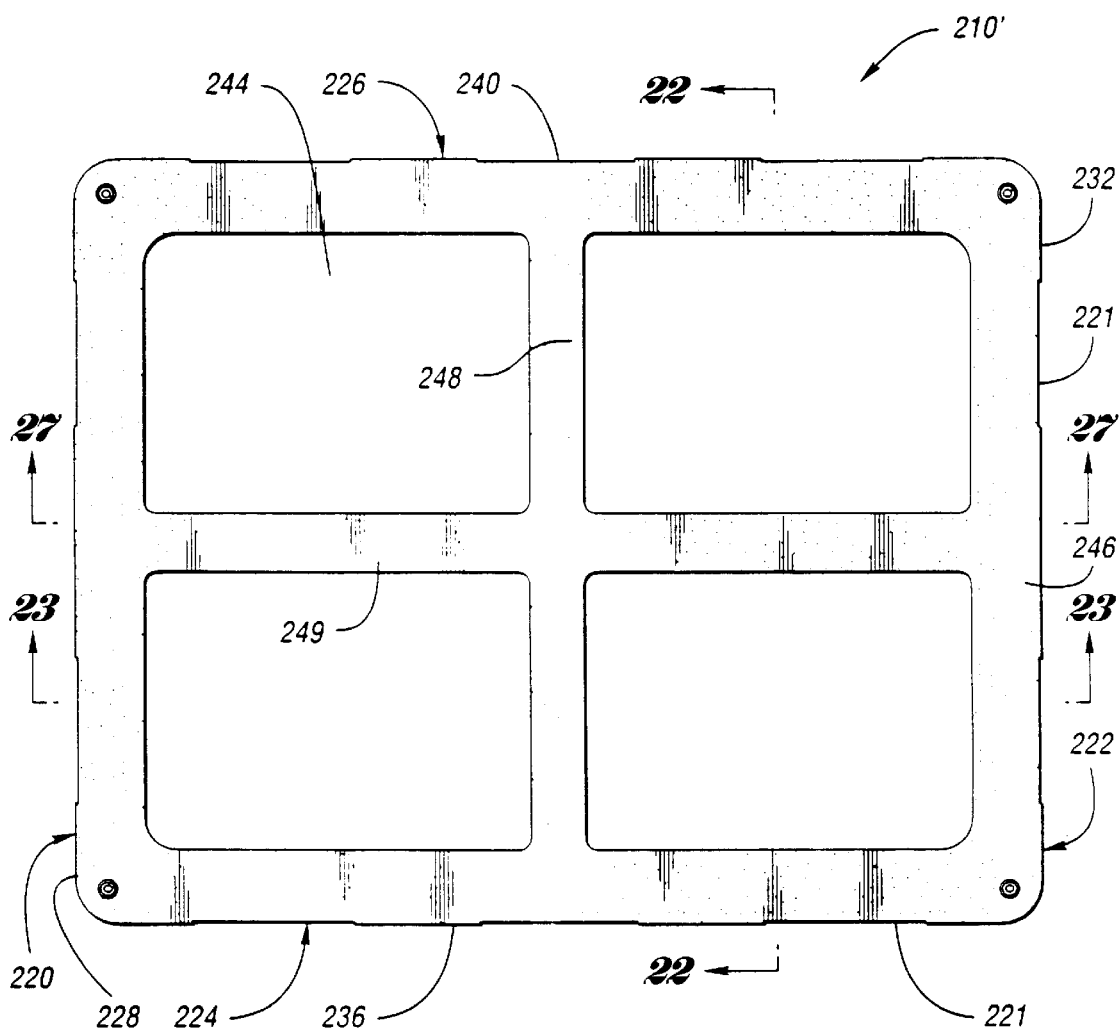
FIG. 19 is a top plan view of the top frame assembly.

FIG. 19 illustrates a top plan view of top frame 210. As shown therein, top frame 210 includes four openings 244 defined by outer rail 246 and cross rails 248, 249. Openings 244 assist in lowering the weight of top frame 210 while the disclosed box-beam sections provide the desired strength and rigidity to top frame 210, similar to the properties disclosed with respect to pallet 10. FIG. 20 illustrates a front side elevational view of top frame 210, particularly showing side 236. FIG. 21 shows a side elevational view of top frame 210, particularly illustrating side 221. FIG. 22 illustrates a cross-sectional view of section line 2222 in FIG. 19. FIG. 23 illustrates another cross-sectional view of section line 23—23 in FIG. 19. FIG. 24 illustrates a bottom plan view of first top frame member 212.

Top frame 210 includes a first pair of opposing edges 220, 222 and a second pair of opposing edges 224, 226. Top frame edge 220 is defined by first top frame member and second top frame member edges 228 and 230, respectively; top frame edge 222 by member edges 232 and 234, respectively; top frame edge 224 by member edges 236 and 238, respectively; and top frame edge 226 by member edges 240 and 242, respectively.

Figure 25:
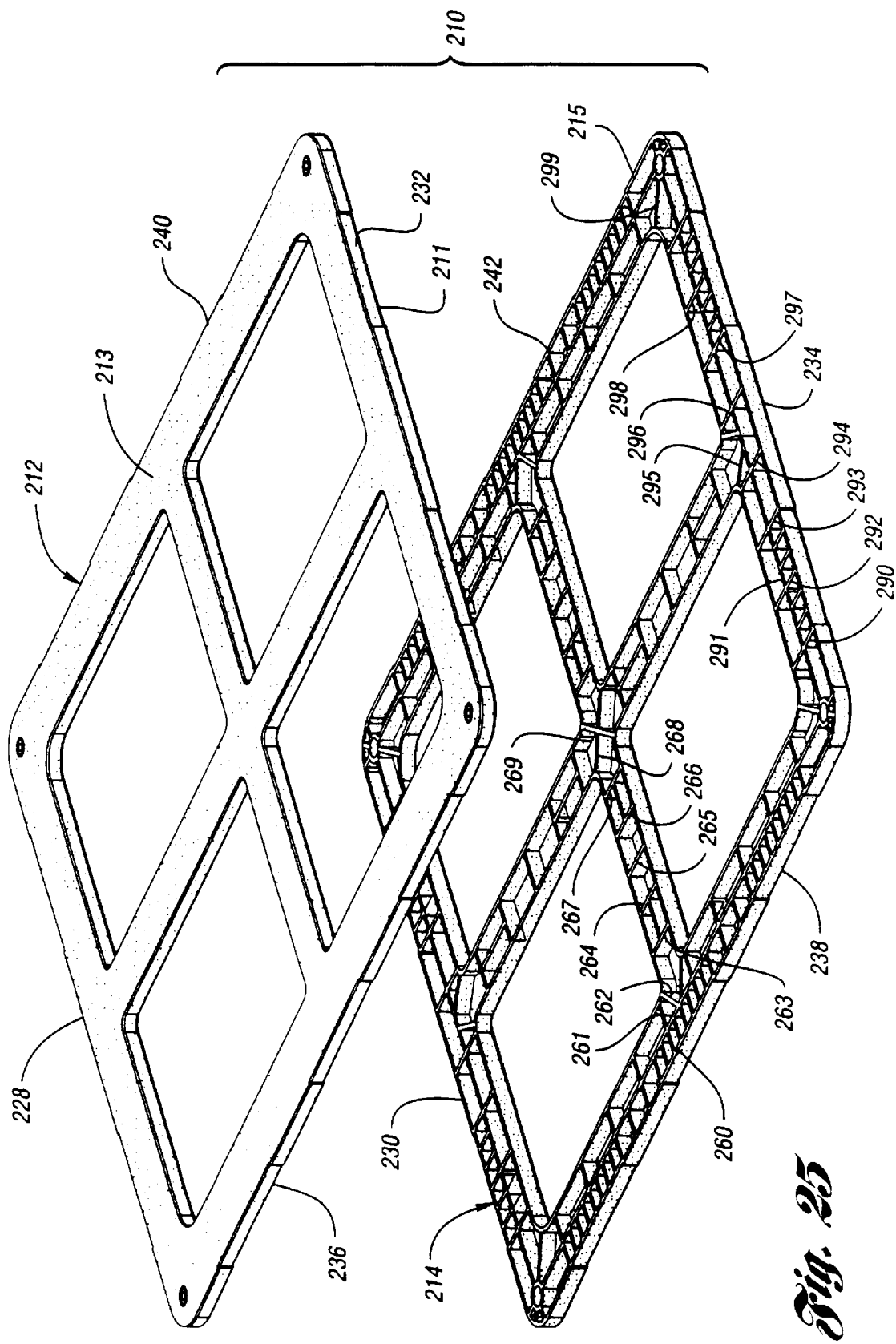
FIG. 25 illustrates an exploded perspective view of the first and second top frame members according to the present invention.
Figure 26:
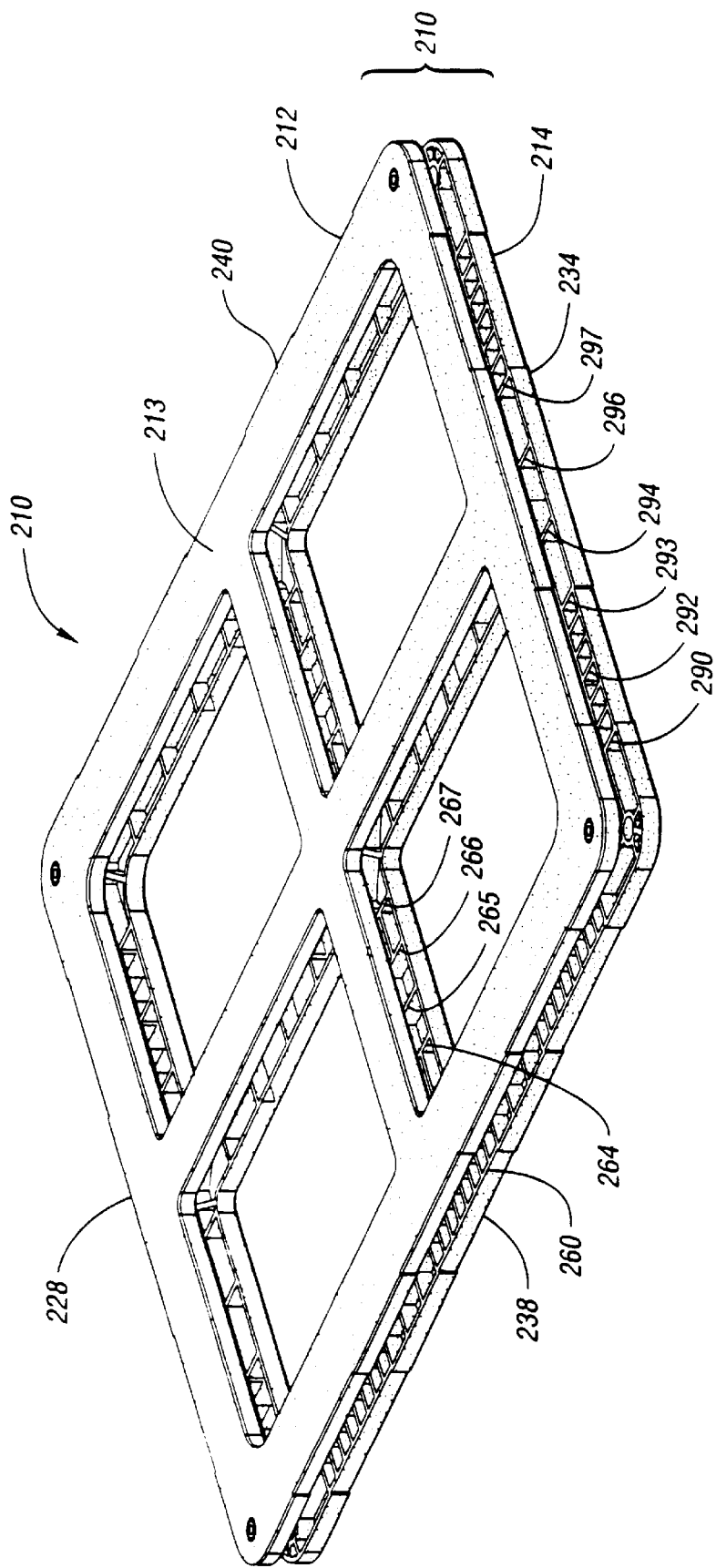
FIG. 26 illustrates a partially separated first top frame member and second top frame member.

According to the present invention, first top frame member 212 and second top frame member 214 are fastened to each other in a method substantially similar to that disclosed herein in association with fastening or welding pallet 10, pallet top deck 12, and pallet bottom deck 14. Referring to FIGS. 25, 26 and 27, for example, first top frame member 212 includes a substantially flat top surface 213 and a plurality of ribs, for example ribs 250, 251, 252, 253, 254, 255, 256, 257, 258, and 259 (250–259) protruding in a downward direction. Second top frame member 214 has a substantially flat bottom surface 217 with a plurality of ribs 260, 261, 262, 263, 264, 265, 266, 267, 268, and 269, extending in an upward direction and which correspond to and mate with those ribs 250–259, respectively, of first top frame member 212. FIG. 27 illustrates a cross-section of top frame 210 taken along line 27—27 of FIG. 19. FIG. 27 illustrates that fastening together, or welding, each of the above respective pairs of ribs 250–259 and 260–269 define box-beam section walls 270, 271, 272, 273, 274, 275, 276, 277, 278, 279 of top frame 210.

Likewise, for example, ribs 280, 281, 282, 283, 284, 285, 286, 287, 288, 289 of first top frame member correspond and mate with ribs 290, 291, 292, 293, 294, 295, 296, 297, 298, 299, respectively, of second top frame member. The corresponding ribs on both members 212, 214 are aligned so they preferably are welded together by plasticizing their mating surfaces preferably via a hot-plate welding operation to form box-beam top frame assembly 210, resulting in a top frame where every section is a box beam. Note that the order of the plasticizing procedure is provided for illustrative purposes only, and of course, such steps may be performed in any feasible order. Also, as with pallet 10, the plasticizing process for the top frame may also be accomplished by infrared radiation or another process designed to provide the desired properties of top frame 210.

First top frame member 212 and second top frame member 214 have corresponding planar surfaces 211, 215 which when mated together and fastened, define parting line 219. Thus planar surfaces 211 and 215 include the corresponding upper or lower edges of ribs 250–259, 260–269, 280–289, and 290–299.

Top frame 210 thus provides greater load stability which allows the objects 216 to be stacked higher and with greater stability. Further, with top frame 210 positioned and secured on top of the stack, it is contemplated that another pallet, such as pallet 10, may be stacked on top of top frame 210.

The box-beam sections extending across top frame 210 also provide improved stiffness and strength to the part and minimize any bowing or flexing of the part, and also to minimize or prevent any deformation that would result from applying straps 220 to a wood top frame. Top frame 210 also includes a recess 223 for receiving a grommet (not shown) therein for providing skid or slip resistance when stacking top frames.

Figure 28B:
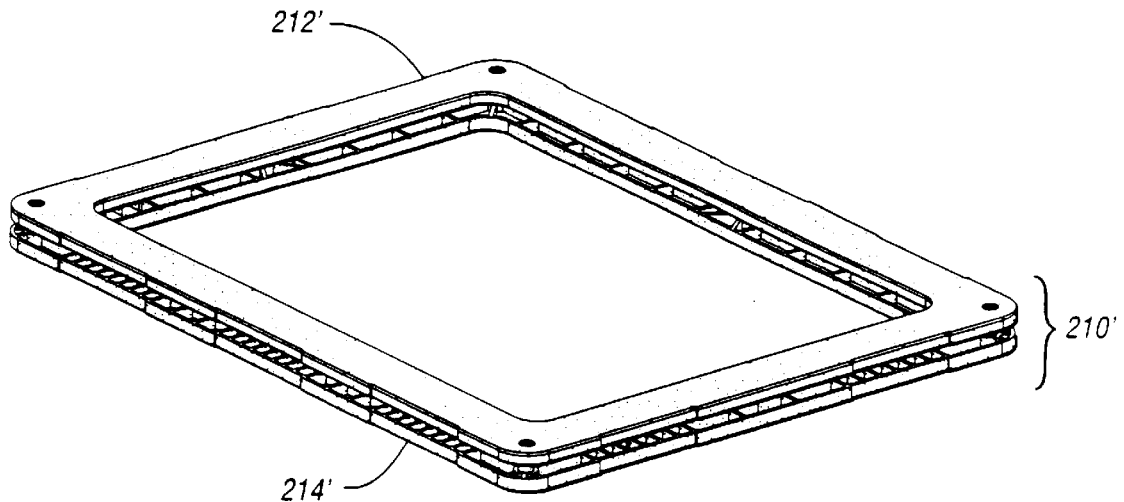
FIG. 28b illustrates a partially exploded perspective view of the second embodiment of the top frame.
Figure 28C:
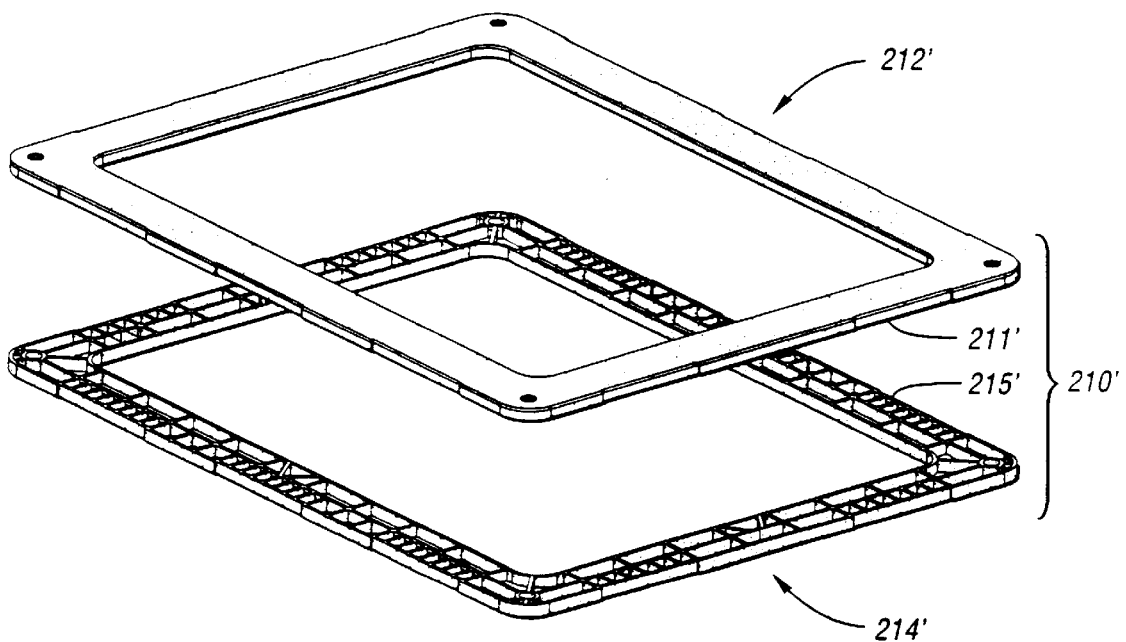
FIG. 28c illustrates an exploded perspective view of the second embodiment of the top frame.

FIG. 28a illustrates a perspective view of a second embodiment of a top frame 210' according to the present invention. Similar features to those disclosed in the first top frame embodiment are assigned a like reference numeral with a prime (') designation. As further illustrated in the exploded views of FIGS. 28b and 28c, top frame 210' includes an outer rail 246' and has a single opening 244'. Top frame 210' also includes recesses 221' for receiving straps 220 therein. Accordingly, with reference to the first and second top frame embodiments 210 and 210', it is contemplated that the top frame according to the present invention may have various designs without departing from the teachings according to the present invention. Thus, top frame 210' includes box beam sections around and between components first top frame member 212' and second top frame member 214' which define rail 246' as illustrated in FIGS. 28b and 28c. In the same manner as disclosed with respect to top frame 210 above, top frame 210' also includes mating planar surfaces 211' and 215' which when fastened according to the teachings of the present invention define box beam sections therein as well as the parting line 219' between first top frame member 212' and second top frame member 214'. Therefore, this alternative design of top frame assembly 210' has the desired stiffness and properties as described in relation to pallet 10 and top frame 210 above.

Referring now to FIGS. 29–34, an alternative box-beam design is also disclosed according to the present invention and in association with FIGS. 29–34. While the box-beam design according to the present invention and shown in FIGS. 29–34 provides many advantages not heretofore found in the art, the embodiment shown and described in association with FIGS. 29–34, relative to the above embodiments, may not completely achieve the properties and characteristics of pallet 10 above, because many areas which may limit deflection may not have a boxed section in this alternative box beam section design.

In a racking scenario, the plastic pallet 310 (which is configured to receive a pallet jack from any side), shown in FIG. 29, is supported from below on two opposing edges 312,314, and loaded on the top deck portion 316. The pallet must support this load with a minimum of deflection. The top deck portion 316 is supported by a plurality of support columns 318 extending from the top deck portion 316 and attached to the support rails 320, which form the bottom deck 319. The support rails 320 are generally relatively weak structural portions of the pallet because they are thin in vertical cross-section and are supported only at opposing ends by the columns 318. Accordingly, the support rails 320 tend to deflect when the pallet is loaded.

As mentioned above, deflection decreases as the section moment of inertia (I) increases. For a pallet, the easiest method to increase stiffness is to increase height. However, in practice there is a maximum allowable height for pallets, and existing pallets are generally designed at this maximum value. Accordingly, the only alternative is to maximize the moment of inertia for the pallet, and particularly for each pallet component, namely the top deck 316, bottom deck and support rails 320.

Therefore, the object of the design is to create hollow or boxed sections everywhere possible. Conventional injection molding techniques make this almost impossible to create, but by using a secondary operation, it is possible to form a boxed top deck 316 and bottom deck 319.

Figure 30:
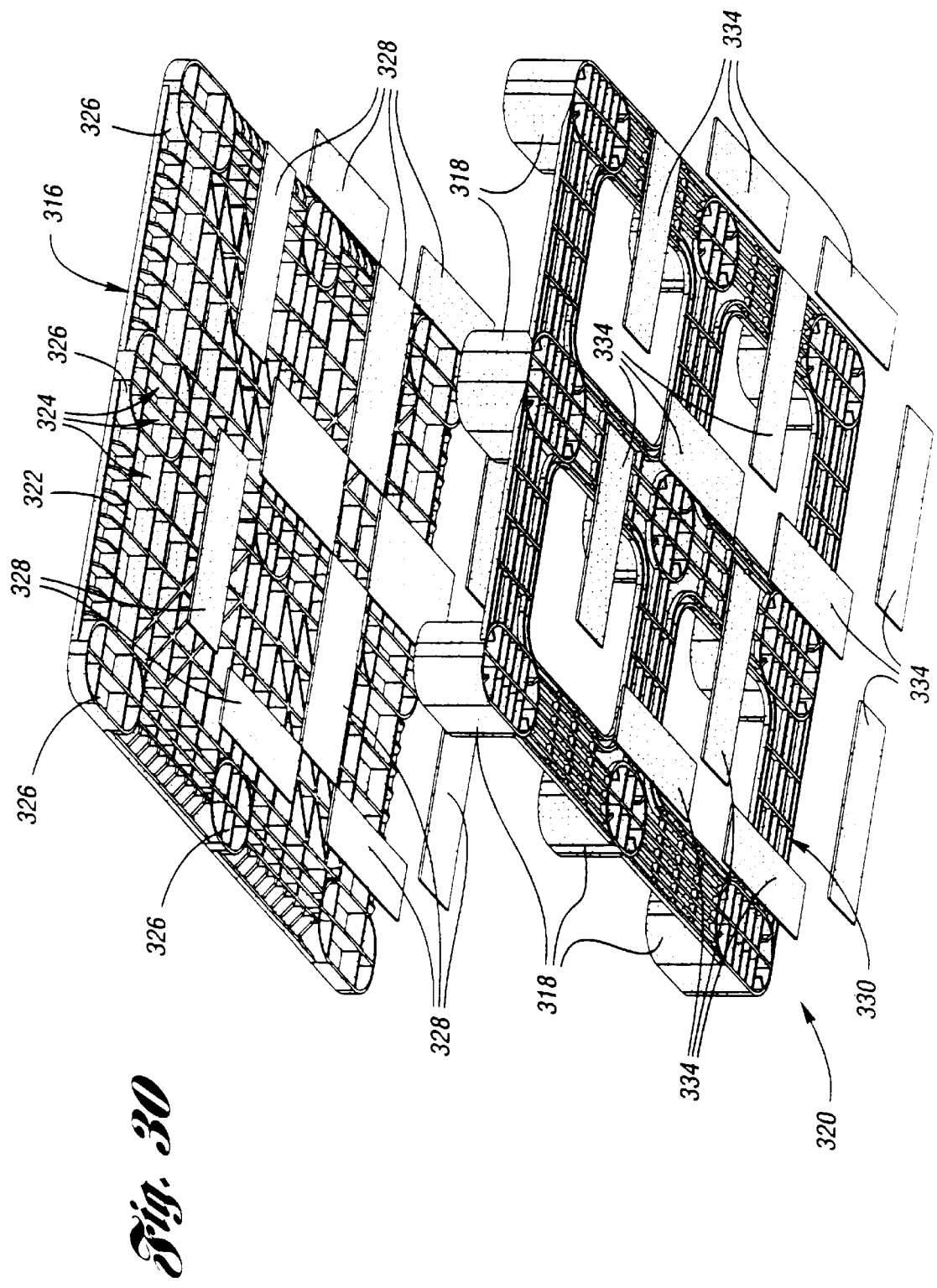
FIG. 30 shows a bottom exploded perspective view of the pallet of FIG. 29.

A pallet in accordance with the present invention includes the top deck portion 316, which is injection molded conventionally and consists of a flat upper surface 322 with a series of ribs 324 protruding from the upper surface 322 as shown in FIG. 30. The top deck portion 316 includes a plurality of pockets 326 for receiving the support columns 318. A plurality of plastic sheet strips 328 are sonically welded to the ribs 324 to form a plurality of substantially rectangular hollow boxed sections between the pockets 326 within the top deck 316 (as described later with reference to FIG. 32). Alternatively, other attachment methods such as vibratory welding, hot plate welding, adhesive etc. may be used for attachment of the plastic sheet strips 328.

The bottom deck 319 is constructed similarly but has the support columns 318 integrally molded therewith. Ribs 330 protrude downwardly from the sheet portions 332 of the support rails 320, and a plurality of plastic sheet strips 334 are welded to the ends of the ribs 330 to form a plurality of boxed cross-sections along the length of the rails 320 between the columns 318. The top and bottom decks 316, 319 may be joined permanently by welding, or can be snapped together as commonly known in the art.

The method described above is preferably used to stiffen conventional ribbed pallet designs. The small sheets of plastic 334 are welded into critical deflection areas of the existing pallets for stiffening. Also, new pallets could be designed to accept the sheets for applications that require racking, and would eliminate the sheets for lighter, lower cost applications. For example, the ribs 330 may be recessed in order to receive the sheets 334 in a position flush with the bottom surface of the support rails 320.

The method described above is particularly applicable for use in pallets such as that shown in FIG. 29 which has a very thin top deck 316 and bottom deck 319 to allow four-way entry of pallet jacks. The method described may be used to maximize the moment of inertia of each deck member.

Figure 32:
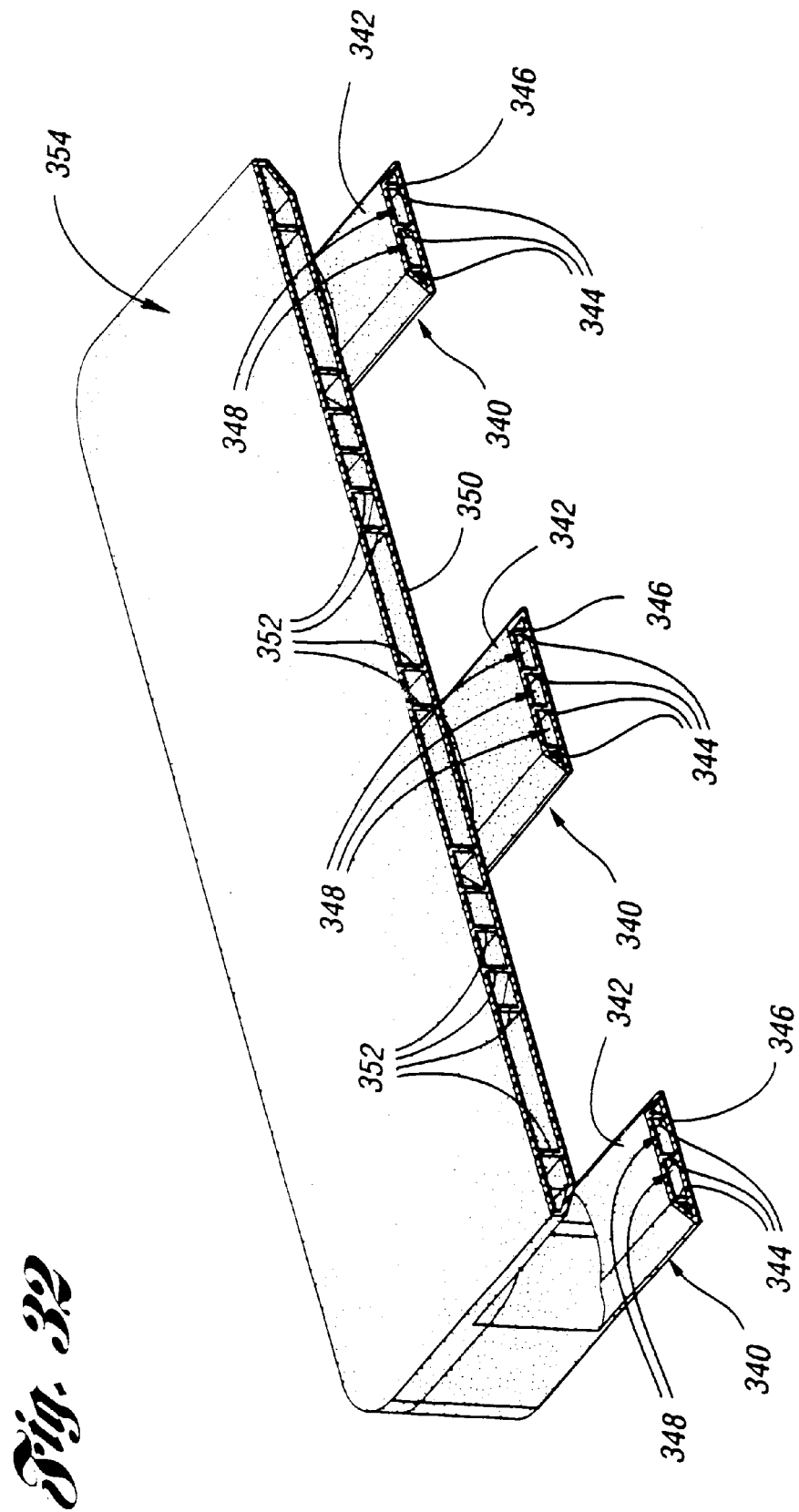
FIG. 32 shows a cutaway perspective sectional view of a pallet in accordance with an alternative embodiment of the invention.

Referring to FIG. 32, an alternative embodiment of the invention is shown. Similar to the embodiment shown in FIG. 29, the bottom deck rails 340 include a sheet portion 342 with a plurality of vertical ribs 344 extending therefrom. The plastic sheet strips 346 are welded to the ribs 344 to form the plurality of substantially rectangular hollow vertical cross-sections 348 along the length of the support rails 340. Of course, numerous ribs 344 could be added to create numerous rectangular cross-sections for further improved structural integrity.

Figure 31:
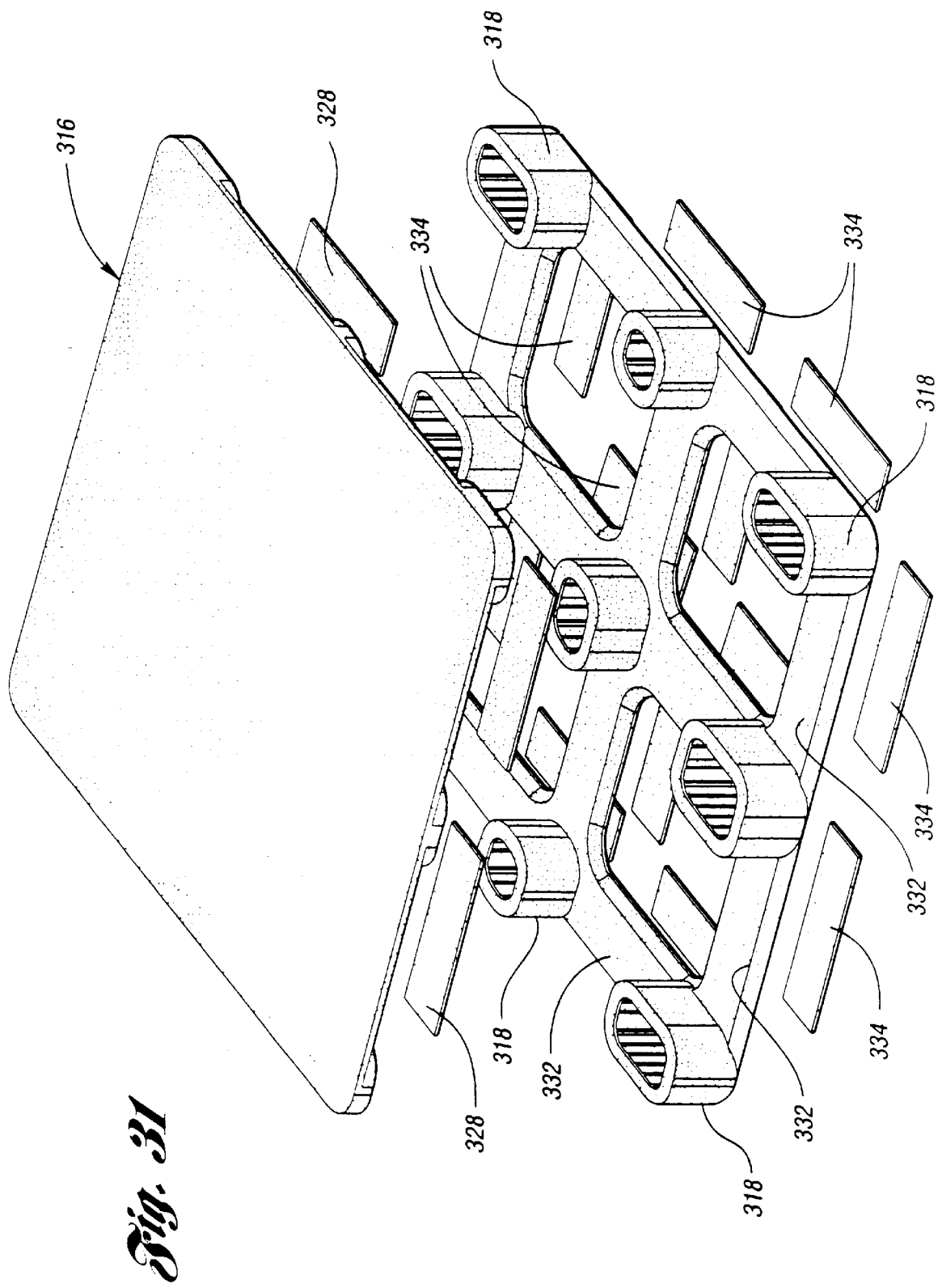
FIG. 31 shows a top exploded perspective view of the pallet of FIG. 29.

The pallet shown in FIG. 32 differs from the earlier embodiment described with reference to the FIGS. 29–31 in that a large sheet 350 is welded to the ribs 352 across the breadth of the upper deck 354 for improved structural integrity of the upper deck 354.

It is contemplated that good results could be achieved even by only welding the peripheral ribs to the plastic sheet strips. It is further contemplated that the plastic sheet strips need not be welded, but could be affixed in any manner, such as adhesive, etc. It is also contemplated that the sheet strips need not be plastic.

Figure 33:
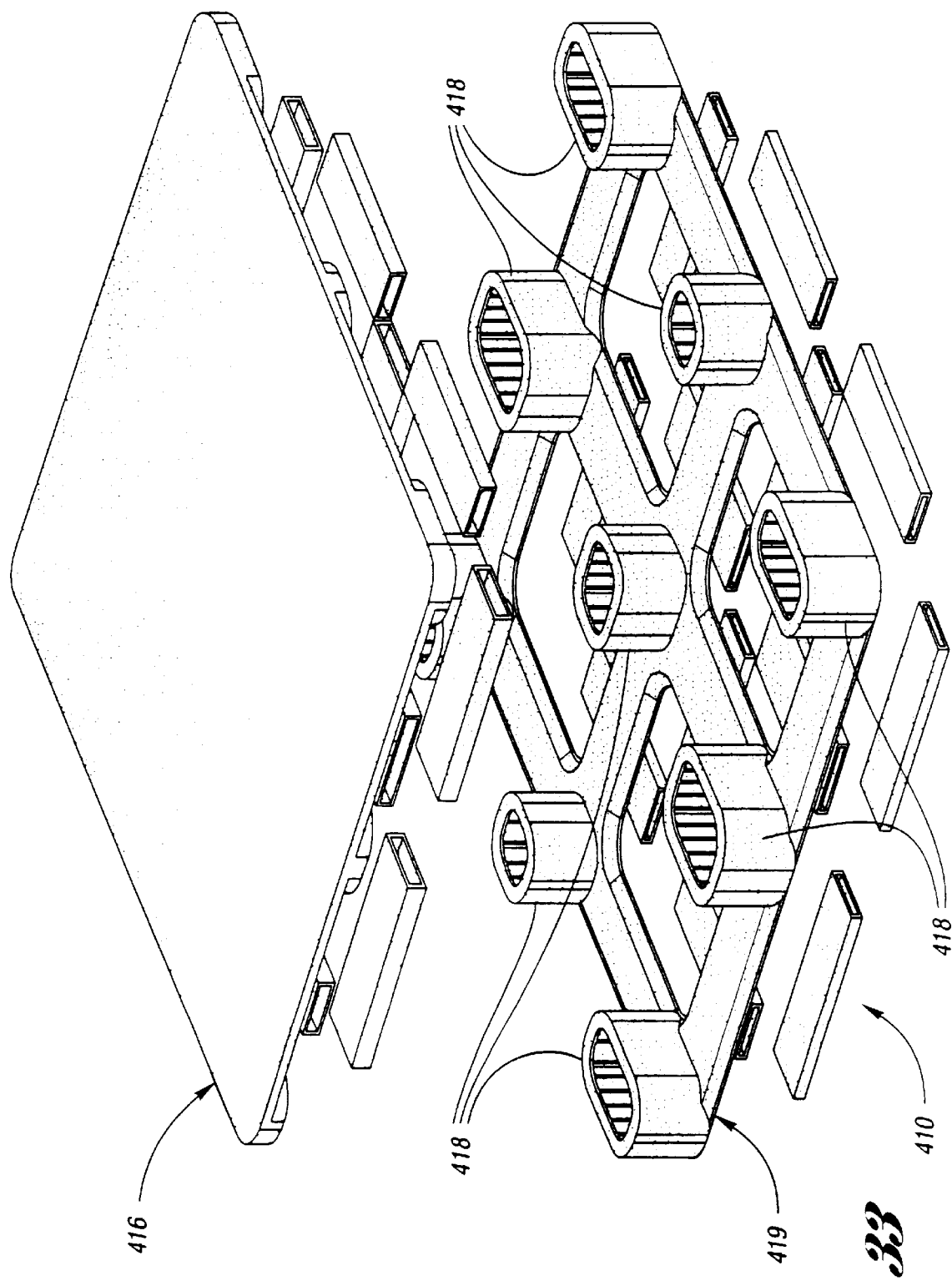
FIG. 33 shows a top exploded perspective view of a pallet in accordance with a second alternative embodiment of the invention.
Figure 34:
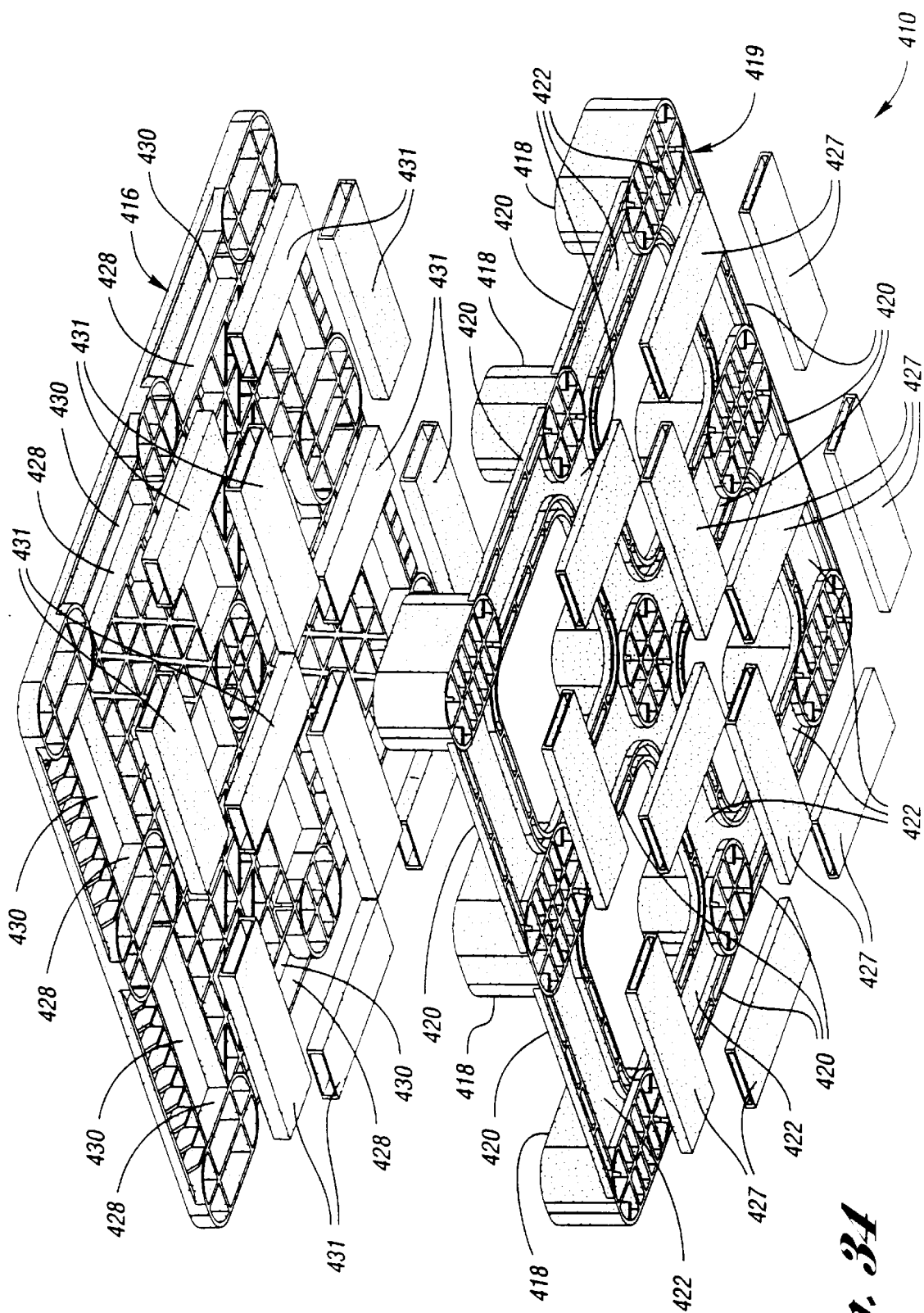
FIG. 34 shows a bottom exploded perspective view of the pallet of FIG. 33.

Referring to FIGS. 33 and 34, another alternative embodiment of the invention is shown. In this embodiment, the pallet 410 includes a thin top deck 416 connected to a thin bottom deck 419 by nine support columns 418. The bottom deck 419 includes a plurality of support rails 420 which extend between the columns 418. Each support rail 420 includes a sheet portion 422. Because each support rail 420 forms a relatively weak structural portion of the pallet 410, an extruded plastic rectangular tube 427 is welded against each respective sheet portion 422 to add stiffness to each support rail by forming substantially rectangular vertical cross-sections along the length of each support rail 420. Similarly, the top deck 416 includes open channels 428 adjacent the top sheet 430, and an extruded plastic rectangular tube 431 is welded within each channel 428 against the top sheet 430 between the columns 418 to form substantially rectangular vertical cross-sections along the length of each channel 428 between the columns 418 for improved stiffness. In this configuration, the rectangular tubes 427,431 may be inexpensively extruded, and add substantial structural integrity to the pallet 410 without limiting the pallet's ability to receive pallet jacks from any side thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pallet assembly, comprising:
    a first pallet component including a first plurality of cross-rib members;
    a second pallet component including a second plurality of cross-rib members corresponding to the first plurality of cross-rib members, the first and second plurality of cross-rib members attached to form a first plurality of box sections, the second pallet component further including a first opposed surface;
    a third pallet component disposed adjacent the second pallet component and having a second opposed surface opposite the first opposed surface of the second pallet component, the third pallet component further including a third plurality of cross-rib members; and
    a fourth pallet component including a fourth plurality of cross-fib members corresponding to the third plurality of cross-rib members, the third and fourth plurality of cross-rib members attached to form a second plurality of box beam sections; and
    at least one intermediate column extending between the first and second opposed surfaces for providing spacing therebetween.

2. The pallet assembly of claim 1, wherein the at least one intermediate column has at least one end which is formed as a unitary construction with at least one of the second and third pallet components.

3. The pallet assembly of claim 1, wherein the at least one intermediate column comprises a first intermediate column portion and a second intermediate column portion which are attached to each other, wherein the first intermediate column portion is formed as a unitary construction with the second pallet component and the second intermediate column portion is formed as a unitary construction with the third pallet component.

4. The pallet assembly of claim 3, wherein the first and second intermediate column portions have mating ribbed surfaces.

5. A pallet assembly, comprising:
    a first pallet component including a first plurality of cross-rib members;
    a second pallet component including a second plurality of cross-rib members corresponding to the first plurality of cross-rib members, the first and second plurality of cross-rib members attached to form a first plurality of box sections, the second pallet component further including a first opposed surface;

a first intermediate column portion attached to the first opposed surface of the second pallet component;

a third pallet component disposed adjacent the second pallet component and having a second opposed surface opposite the first opposed surface of the second pallet component, the third pallet component further including a third plurality of cross-rib members;

a second intermediate column portion attached to the second opposed surface of the third pallet component; and a fourth pallet component including a fourth plurality of cross-rib members corresponding to the third plurality of cross-rib members, the third and fourth plurality of cross-rib members attached to form a second plurality of box beam sections, wherein the first intermediate column portion and a second intermediate column portion having mating surfaces which are attached to each other to form intermediate columns between the second and third pallet components.

6. The pallet assembly of claim 5, wherein the first intermediate column portion is formed as a unitary construction with the second pallet component, and wherein the second intermediate column portion is formed as a unitary construction with the third pallet component.

7. A pallet comprising:

a first component having a first upper surface, and a first lower surface including a first plurality of cross-rib members;

a second component having a second lower surface, and also having a second upper surface which includes a second plurality of cross-rib members corresponding to the first plurality of cross-rib members and mounted thereto;

a third component disposed adjacent the second component and having a third upper surface, and also having a third lower surface which includes a third plurality of cross-rib members;

a fourth component having a fourth upper surface including a fourth plurality of cross-rib members corresponding to the third plurality of cross-rib members and mounted thereto; and a plurality of intermediate column members extending between the second lower surface and third upper surface for providing spacing therebetween, wherein the first and second plurality of cross-rib members form box beam sections, and the third and fourth plurality of cross-rib members form box beam sections.

8. A pallet comprising:

a first component having a first upper surface, and a first lower surface including a first plurality of cross-rib members;

a second component having a second lower surface, and also having a second upper surface which includes a second plurality of cross-rib members corresponding to the first plurality of cross-rib members and mounted thereto;

a third component disposed adjacent the second component and having a third upper surface, and also having a third lower surface which includes a third plurality of cross-rib members;

a fourth component having a fourth upper surface including a fourth plurality of cross-rib members corresponding to the third plurality of cross-rib members and mounted thereto; and a plurality of intermediate column members extending between the second lower surface and third upper surface for providing spacing therebetween, wherein the intermediate column members have at least one end which are formed as a unitary construction with one of the second and third components.

* * * * *